US012605926B2

(12) United States Patent
Ho et al.

(10) Patent No.: US 12,605,926 B2
(45) Date of Patent: Apr. 21, 2026

(54) BINDER COMPOSITION FOR SECONDARY BATTERY

(71) Applicant: GRST SINGAPORE PTE. LTD., Singapore (SG)

(72) Inventors: Kam Piu Ho, Hong Kong (CN); Yingkai Jiang, Shenzhen (CN); Tao Gong, Shenzhen (CN)

(73) Assignee: GRST SINGAPORE PTE. LTD., Singapore (SG)

( * ) Notice: Subject to any disclaimer, the term of this patent is extended or adjusted under 35 U.S.C. 154(b) by 598 days.

(21) Appl. No.: 17/927,750

(22) PCT Filed: Jun. 15, 2021

(86) PCT No.: PCT/CN2021/099950

§ 371 (c)(1),
(2) Date: Nov. 25, 2022

(87) PCT Pub. No.: WO2021/254300

PCT Pub. Date: Dec. 23, 2021

(65) Prior Publication Data

US 2023/0216055 A1 Jul. 6, 2023

(30) Foreign Application Priority Data

Jun. 17, 2020 (WO) ................ PCT/CN2020/096672
Aug. 19, 2020 (WO) ................ PCT/CN2020/110065
Sep. 25, 2020 (WO) ................ PCT/CN2020/117789

(51) Int. Cl.

| | |
|---|---|
| ***H01M 4/62*** | (2006.01) |
| ***B32B 43/00*** | (2006.01) |
| ***C11D 7/06*** | (2006.01) |
| ***C11D 7/50*** | (2006.01) |
| ***C22B 7/00*** | (2006.01) |
| ***C22B 21/00*** | (2006.01) |
| ***H01M 4/04*** | (2006.01) |
| ***H01M 4/36*** | (2006.01) |
| ***H01M 10/0525*** | (2010.01) |
| ***H01M 10/54*** | (2006.01) |
| *H01M 4/02* | (2006.01) |

(52) U.S. Cl.

CPC .............. *B32B 43/006* (2013.01); *C11D 7/06* (2013.01); *C11D 7/5004* (2013.01); *C22B 7/008* (2013.01); *C22B 21/0023* (2013.01); *H01M 4/0404* (2013.01); *H01M 4/366* (2013.01); *H01M 4/621* (2013.01); *H01M 4/622* (2013.01); *H01M 4/624* (2013.01); *H01M 4/625* (2013.01); *H01M 10/0525* (2013.01); *H01M 10/54* (2013.01); *B32B 2250/02* (2013.01); *B32B 2305/70* (2013.01); *B32B 2457/10* (2013.01); *C11D 2111/16* (2024.01); *H01M 2004/028* (2013.01); *Y10T 156/1111* (2015.01); *Y10T 156/1116* (2015.01)

(58) Field of Classification Search

CPC .............. B32B 43/006; B32B 2250/02; B32B 2305/70; B32B 2457/10; C11D 7/06; C11D 7/5004; C11D 2111/16; C22B 7/008; C22B 21/0023; H01M 4/0404; H01M 4/366; H01M 4/621; H01M 4/622; H01M 4/624; H01M 4/625; H01M 10/0525; H01M 10/54; H01M 2004/028; H01M 2220/20; H01M 4/131; H01M 4/136; H01M 4/485; H01M 4/505; H01M 4/525; H01M 4/5815; H01M 4/5825; H01M 4/623; H01M 4/62; Y10T 156/1111; Y10T 156/1116; C09D 133/20; C09D 5/00; C09D 5/008; C09D 5/022; C08F 220/44; C08L 33/20; Y02E 60/10; Y02W 30/62

See application file for complete search history.

(56) References Cited

U.S. PATENT DOCUMENTS

| | | | | |
|---|---|---|---|---|
| 2017/0062828 A1* | 3/2017 | Sonobe | ............. | H01M 10/0525 |
| 2018/0337381 A1* | 11/2018 | Seo | ........................ | H01M 4/505 |
| 2019/0085109 A1* | 3/2019 | Goto | ...................... | C08F 220/46 |
| 2019/0305315 A1* | 10/2019 | Fukuchi | ................ | H01M 4/622 |
| 2020/0075930 A1* | 3/2020 | Kim | ...................... | H01M 4/505 |
| 2020/0152985 A1* | 5/2020 | Yamamoto | .......... | H01M 50/449 |
| 2022/0359878 A1* | 11/2022 | Akabane | ................ | C08L 51/04 |

FOREIGN PATENT DOCUMENTS

| | | | |
|---|---|---|---|
| CN | 102770995 | A | 11/2012 |
| CN | 108183223 | A | 6/2018 |
| CN | 108780894 | A | 11/2018 |
| CN | 109690841 | A | 4/2019 |
| CN | 110387162 | A | 10/2019 |
| CN | 110885650 | A | 3/2020 |
| CN | 111139002 | A | 5/2020 |
| EP | 2555293 | B1 | 3/2014 |
| EP | 4088331 | A1 | 11/2022 |

OTHER PUBLICATIONS

International Search Report of PCT Patent Application No. PCT/CN2021/099950 issued on Jul. 26, 2021.

European Search Report of European Patent Application No. 21827012.2 issued on Jul. 22, 2024.

* cited by examiner

*Primary Examiner* — Muhammad S Siddiquee

(57) ABSTRACT

Provides an aqueous binder composition for a secondary battery electrode, comprising a copolymer and a dispersion medium, wherein the copolymer comprises a structural unit (a), a structural unit (b), and a structural unit (c). The binder composition disclosed herein has improved binding capability. In addition, battery cells comprising electrodes prepared using the binder composition disclosed herein exhibits exceptional electrochemical performance.

19 Claims, 1 Drawing Sheet

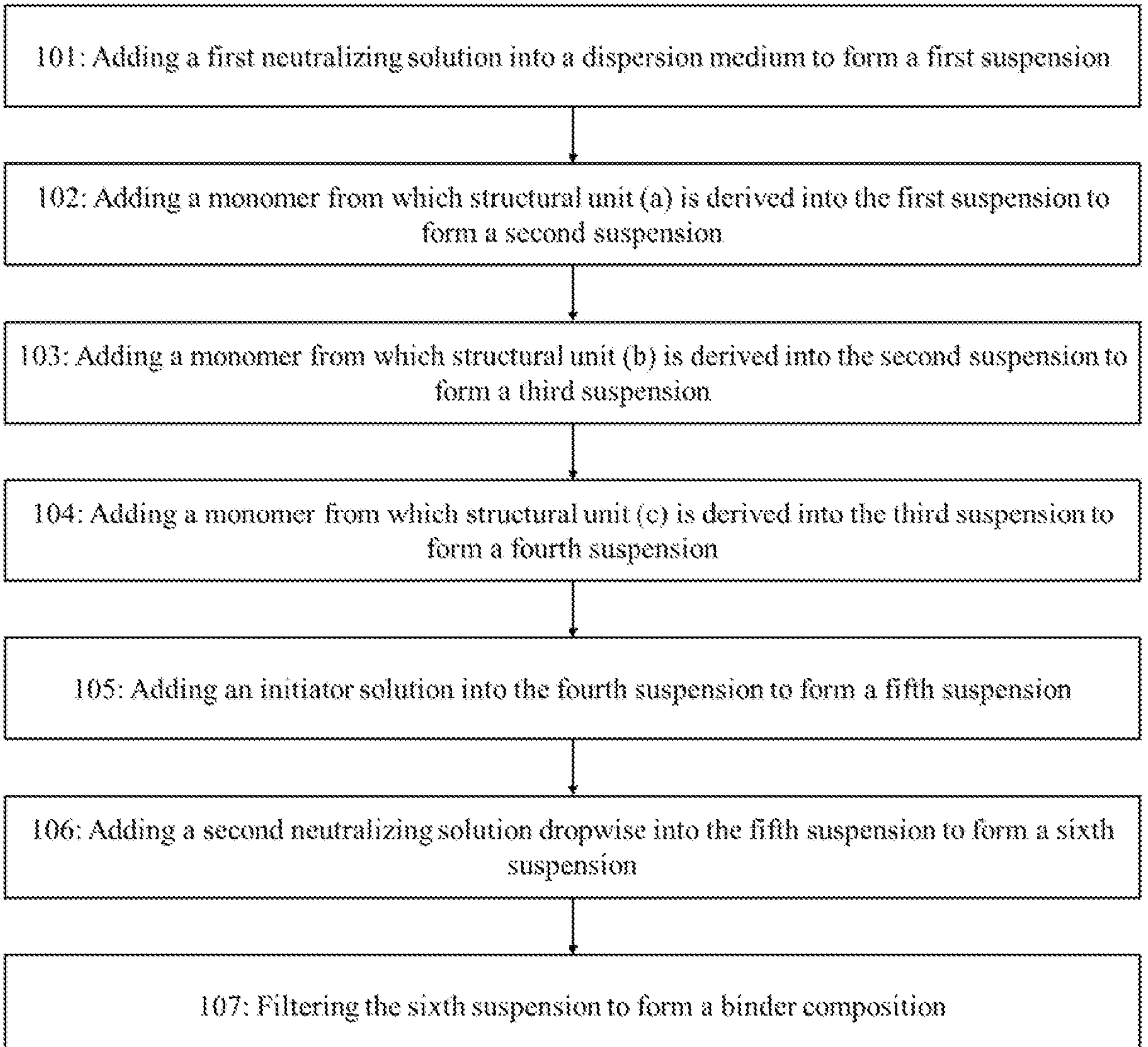
100
101: Adding a first neutralizing solution into a dispersion medium to form a first suspension
102: Adding a monomer from which structural unit (a) is derived into the first suspension to form a second suspension
103: Adding a monomer from which structural unit (b) is derived into the second suspension to form a third suspension
104: Adding a monomer from which structural unit (c) is derived into the third suspension to form a fourth suspension
105: Adding an initiator solution into the fourth suspension to form a fifth suspension
106: Adding a second neutralizing solution dropwise into the fifth suspension to form a sixth suspension
107: Filtering the sixth suspension to form a binder composition

BINDER COMPOSITION FOR SECONDARY BATTERY

CROSS-REFERENCE TO RELATED APPLICATIONS

This is a U.S. national stage application of the International Patent Application No. PCT/CN2021/099950, filed Jun. 15, 2021, which claims the benefit under 35 U.S.C. § 365(c) of International Patent Application No. PCT/CN2020/096672, filed Jun. 17, 2020, International Patent Application No. PCT/CN2020/110065, filed Aug. 19, 2020 and International Patent Application No. PCT/CN2020/117789, filed Sep. 25, 2020, the content of all of which are incorporated herein by reference in their entireties.

FIELD OF THE INVENTION

The present invention relates to the field of batteries. In particular, this invention relates to a binder composition for lithium-ion batteries.

BACKGROUND OF THE INVENTION

Over the past decades, lithium-ion batteries (LIBs) have come to be widely utilized in various applications, especially consumer electronics, because of their outstanding energy density, long cycle life and high discharging capability. Due to rapid market development of electric vehicles (EV) and grid energy storage, high-performance, low-cost LIBs are currently offering one of the most promising options for large-scale energy storage devices.

Generally, lithium-ion battery electrodes are manufactured by coating an organic-based slurry onto a metallic current collector, the slurry containing an electrode active material, conductive carbon, and a binder in an organic solvent. The binder provides good electrochemical stability by holding together the electrode components and adhering them to the current collector. Polyvinylidene fluoride (PVDF) is one of the most commonly used binders in the commercial lithium-ion battery industry. However, PVDF is insoluble in water and can only dissolve in some specific organic solvents such as N-methyl-2-pyrrolidone (NMP), which is flammable and toxic and hence requires specific handling.

Due to the above-mentioned hazards, when using NMP, a recovery system must be in place during the drying process to recover NMP vapors. This generates significant costs in the manufacturing process since it requires a large capital investment. Therefore, the use of less expensive and more environmentally friendly solvents, such as water, is preferable since it can eliminate the large capital cost of the recovery system.

In view of such problem, attempts have been made to replace the conventional PVDF with more environmentally friendly, water-soluble binder materials, or to make use of the known advantages of PVDF as a binder for electrode slurries without using organic solvents that require specific recovery treatment during electrode manufacture.

Known aqueous binders such as carboxymethyl cellulose (CMC) and styrene-butadiene rubber (SBR) exhibit only marginal adhesion capability and poor cycle life. SBR, in particular, requires a thickening agent to regulate the binder viscosity. Furthermore, SBR exhibits high expandability and undesirable agglomeration, resulting in inhomogeneous dispersion in the electrode slurry, high electrode resistance and poor electrode performance. In addition, within the battery, cathodes are at a high voltage, yet most rubbers (including SBR) are only stable at the low voltage of the anode and decompose at high voltage. Therefore, their applications, especially in cathodes, are somewhat limited.

EP U.S. Pat. No. 2,555,293 B1 discloses a water-based electrode slurry for a lithium ion-containing electrochemical cell. The slurry comprises an electrochemically active material and a combination of PVDF, SBR and at least one of polyacrylic acid (PAA) and CMC in an aqueous solution. The prior art attempts to combine PVDF with a water-based slurry to achieve easier handling, less environmental pollution and reduced costs, while keeping the known chemical and electrochemical advantages of PVDF as a binder. These advantages include electrochemical stability, lifetime stability and the fact that the amount of binder needed is relatively small, which enables higher C-rates. Although the slurry disclosed in the prior art is free of organic solvents, it nonetheless comprises a fluorine-containing binder. PVDF is highly fluorinated and decomposes into toxic substances when exposed to heat, which poses risks to human health and the environment.

In view of the above, there is always a need for an aqueous binder composition for secondary batteries that exhibits excellent adhesion capability and high electrochemical stability and that can sustain such properties during the making of a cathode slurry, so that the binder composition contributes to providing the batteries with exceptional electrochemical performance.

SUMMARY OF THE INVENTION

The aforementioned needs are met by various aspects and embodiments disclosed herein. Provided herein is a binder composition for a secondary battery electrode comprising a copolymer and a dispersion medium, wherein the copolymer comprises structural units (a), (b) and (c). Such binder composition displays an improved binding capability. In addition, battery cells comprising a cathode prepared using the binder composition disclosed herein exhibits exceptional electrochemical performance.

BRIEF DESCRIPTION OF THE DRAWINGS

FIG. 1 is a flow chart of an embodiment illustrating the steps for preparing a binder composition.

DETAILED DESCRIPTION OF THE INVENTION

Provided herein is a binder composition for a secondary battery electrode comprising a copolymer and a dispersion medium, wherein the copolymer comprises a structural unit (a), a structural unit (b), and a structural unit (c).

The term "electrode" refers to a "cathode" or an "anode."

The term "positive electrode" is used interchangeably with cathode. Likewise, the term "negative electrode" is used interchangeably with anode.

The term "binder", "binder material" or "binder composition" refers to a chemical compound, mixture of compounds, or polymer which form colloidal solutions or colloidal dispersions in a dispersion medium, and is used to hold an electrode active material and/or a conductive agent in place and adhere them onto a conductive metal part to form an electrode.

The term "conductive agent" refers to a material that has good electrical conductivity. Therefore, a conductive agent is often mixed with an electrode active material at the time of forming an electrode to improve electrical conductivity of the electrode. In some embodiments, the conductive agent is chemically active. In some embodiments, the conductive agent is chemically inactive.

The term "polymer" refers to a polymeric compound prepared by polymerizing monomers, whether of the same or a different type. The generic term "polymer" embraces the terms "homopolymer" as well as "copolymer".

The term "homopolymer" refers to a polymer prepared by the polymerization of the same type of monomer.

The term "copolymer" refers to a polymer prepared by the polymerization of two or more different types of monomers.

The term "unsaturated" refers to a moiety having one or more units of unsaturation.

The term "alkyl" or "alkyl group" refers to a univalent group having the general formula $C_nH_{2n+1}$ derived from removing a hydrogen atom from a saturated, unbranched or branched aliphatic hydrocarbon, where n is an integer. Examples of alkyl groups include, but are not limited to, $C_1$-$C_8$alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents.

The term "cycloalkyl" or "cycloalkyl group" refers to a saturated or unsaturated cyclic non-aromatic hydrocarbon radical having a single ring or multiple condensed rings. Examples of cycloalkyl groups include, but are not limited to, $C_3$-$C_7$ cycloalkyl groups, such as cyclopropyl, cyclobutyl, cyclopentyl, cyclohexyl, and cycloheptyl; $C_3$-$C_7$ cycloalkenyl groups, such as cyclopropenyl, cyclobutenyl, cyclopentenyl, cyclohexenyl, and cycloheptenyl; and cyclic and bicyclic terpenes. A cycloalkyl group can be unsubstituted or substituted by one or two suitable substituents.

The term "alkoxy" refers to an alkyl group, as previously defined, attached to the principal carbon chain through an oxygen atom. Some non-limiting examples of the alkoxy group include methoxy, ethoxy, propoxy, butoxy, and the like. And the alkoxy defined above may be substituted or unsubstituted, wherein the substituent may be, but is not limited to, deuterium, hydroxy, amino, halo, cyano, alkoxy, alkyl, alkenyl, alkynyl, mercapto, nitro, and the like.

The term "alkenyl" refers to an unsaturated straight chain, branched chain, or cyclic hydrocarbon radical that contains one or more carbon-carbon double bonds. Examples of alkenyl groups include, but are not limited to, ethenyl, 1-propenyl, or 2-propenyl, which may optionally be substituted on one or more of the carbon atoms of the radical.

The term "aryl" or "aryl group" refers to an organic radical derived from a monocyclic or polycyclic aromatic hydrocarbon by removing a hydrogen atom. Non-limiting examples of the aryl group include phenyl, naphthyl, benzyl, tolanyl group, sexiphenyl, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

The term "aliphatic" refers to alkyl, alkenyl, alkynyl, alkylene, alkenylene, or alkynylene.

The term "aromatic" refers to groups comprising aromatic hydrocarbon rings, optionally including heteroatoms or substituents. Examples of such groups include, but are not limited to, phenyl, tolyl, biphenyl, o-terphenyl, m-terphenyl, p-terphenyl, naphthyl, anthryl, phenanthryl, pyrenyl, triphenylenyl, and derivatives thereof.

The term "substituted" as used to describe a compound or chemical moiety refers to that at least one hydrogen atom of that compound or chemical moiety is replaced with a second chemical moiety. This second chemical moiety is referred to as a "substituent". Examples of substituents include, but are not limited to, halogen; alkyl; heteroalkyl; alkenyl; alkynyl; aryl, heteroaryl, hydroxyl; alkoxyl; amino; nitro; thiol; thioether; imine; cyano; amido; phosphonato; phosphinato; carboxyl; thiocarbonyl; sulfonyl; sulfonamide; acyl; formyl; acyloxy; alkoxycarbonyl; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; —$CO_2CH_3$; —$CONH_2$; —$OCH_2CONH_2$; —$NH_2$; —$SO_2NH_2$; —$OCHF_2$; —$CF_3$; —$OCF_3$; —NH(alkyl); —N(alkyl)$_2$; —NH (aryl); —N(alkyl) (aryl); —N(aryl)$_2$; —CHO; —CO(alkyl); —CO(aryl); —$CO_2$(alkyl); and —$CO_2$(aryl); and such moieties can also be optionally substituted by a fused-ring structure or bridge, for example —$OCH_2O$—. These substituents can optionally be further substituted with a substituent selected from such groups. All chemical groups disclosed herein can be substituted, unless specified otherwise.

The term "halogen" or "halo" refers to F, Cl, Br or I.

The abbreviation "(meth)acryl-" includes both "acryl-" and "methacryl-"

The term "monomeric unit" refers to the constitutional unit contributed by a single monomer to the structure of a polymer.

The term "structural unit" refers to the total monomeric units contributed by the same monomer type in a polymer.

The term "applying" refers to an act of laying or spreading a substance on a surface.

The term "current collector" refers to any conductive substrate, which is in contact with an electrode layer and is capable of conducting an electrical current flowing to electrodes during discharging or charging a secondary battery. Some non-limiting examples of the current collector include a single conductive metal layer or substrate and a single conductive metal layer or substrate with an overlying conductive coating layer, such as a carbon black-based coating layer. The conductive metal layer or substrate may be in the form of a foil or a porous body having a three-dimensional network structure, and may be a polymeric or metallic material or a metalized polymer. In some embodiments, the three-dimensional porous current collector is covered with a conformal carbon layer.

The term "electrode layer" refers to a layer that is in contact with a current collector and that comprises an electrochemically active material. In some embodiments, the electrode layer is made by applying a coating on to the current collector. In some embodiments, the electrode layer is located on the surface of the current collector. In other embodiments, the three-dimensional porous current collector is coated conformally with an electrode layer.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "particle size D50" refers to a volume-based accumulative 50% size (D50), which is a particle size at a point of 50% on an accumulative curve (i.e., a diameter of a particle in the 50th percentile (median) of the volumes of particles) when the accumulative curve is drawn so that a particle size distribution is obtained on the volume basis and the whole volume is 100%. Further, with respect to the cathode active material of the present invention, the particle size D50 means a volume-averaged particle size of secondary particles which can be formed by mutual agglomeration of primary particles, and in a case where the particles are composed of the primary particles only, it means a volume-averaged particle size of the primary particles.

The term "polydispersity index" (PDI) refers to a ratio of the weight average molecular weight ($M_w$) relative to the number average molecular weight ($M_n$). It is a measure of the distribution of the molecular weight within a given binder composition sample.

The term "solid content" refers to the amount of non-volatile material remaining after evaporation.

The term "mean roughness depth" ($R_z$) refers to the arithmetic mean value of the single roughness depths of consecutive sampling lengths of a current collector.

The term "peeling strength" refers to the amount of force required to separate a current collector and an electrode active material coating that are bonded to each other. It is a measure of the adhesion strength between such two materials and is usually expressed in N/cm.

The term "adhesive strength" refers to the amount of force required to separate a current collector and a binder composition coating that are bonded to each other. It is a measure of the adhesion strength between such two materials and is usually expressed in N/cm.

The term "swelling" refers to a volumetric evolution of binder composition after soaking in the electrolyte or the uptake of electrolyte due to electrolyte-binder interactions.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 ampere-hour (Ah) is the equivalent of 3,600 coulombs of electrical charge. Similarly, the term "milliampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight, usually expressed in Ah/kg or mAh/g.

In the following description, all numbers disclosed herein are approximate values, regardless of whether the word "about" or "approximate" is used in connection therewith. They may vary by 1 percent, 2 percent, 5 percent, or, sometimes, 10 to 20 percent. Whenever a numerical range with a lower limit. $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 0 percent to 100 percent. Moreover, any numerical range defined by two R numbers as defined in the above is also specifically disclosed.

Currently, cathodes are often prepared by dispersing a cathode active material, a binder material and a conductive agent in an organic solvent such as N-methyl-2-pyrrolidone (NMP) to form a cathode slurry, then coating the cathode slurry onto a current collector and drying it.

Very often the binder's influence on cell performance is underestimated, as they are considered to be electrochemically inactive materials. The purpose of a binder is to adhere the active material particles and the conductive agent together to form a continuous electrical conduction path to the current collector. Along with the binding capability, a binder material should be capable of facilitating electron and ion transportation to reduce the impedance between the current collector and the electrode materials, as well as have sufficient elasticity to prevent the electrode from swelling due to volume expansion and contraction of the electrode active material during charging and discharging.

Polyvinylidene fluoride (PVDF) has been widely used as a binder material in the production of lithium-ion batteries. However, PVDF can only dissolve in specific organic solvents such as NMP, which, as explained above, is hazardous and requires a recovery system to recover the vapors released during the drying process. This gives rise to significant energy consumption and production costs in the manufacturing process. Accordingly, exploring a new, environmentally friendly binder material to replace PVDF has become imperative in the development of lithium-ion battery binder materials.

Carboxymethyl cellulose (CMC) and styrene butadiene rubber (SBR) are some of the typical aqueous binders that have already been used in large-scale commercial applications. However, these binders have limited binding strengths and cannot effectively prevent electrode swelling. Furthermore, within the battery, cathodes are at high voltage, yet most rubbers (including SBR) are only stable at the low voltage of the anode and will decompose at high voltage. Therefore, the applications of these binders, especially in cathodes, are somewhat limited.

Accordingly, the present invention provides an aqueous binder composition comprising a copolymer and a dispersion medium, wherein the copolymer comprises structural unit (a), (b) and (c), as well as an electrode comprising said binder composition. It is found that the binder composition described herein exhibits enhanced adhesive capability and flexibility and simultaneously has the unexpected effect of improving the capacity and electrochemical performance of cathodes formed therefrom.

FIG. 1 is a flow chart illustrating the steps of method 100 for preparing an embodiment of the binder composition disclosed herein. In some embodiments, the binder composition described herein is produced via polymerization of monomers, polymers or monomer-polymer complexes dispersed in an aqueous phase, wherein the polymerization is initiated by free radicals generated by a water-soluble free radical initiator.

In some embodiments, a first suspension is formed by adding a first neutralizing solution into a dispersion medium in step 101. In some embodiments, the first neutralizing solution is prepared by dissolving a first neutralizing agent in water. Addition of the neutralizing solution helps to improve the stability of the polymerization reaction and provide a pH range in which the initiator, which will be added at a later stage, is capable of generating free radicals.

Establishing a desirable pH range to work with is especially important in aqueous systems, and neutralizing agents are commonly used for pH adjustment. In some embodiments, the neutralizing agent include alkaline aqueous solutions. In some embodiments, the neutralizing agent may be selected from the group consisting of ammonia, sodium bicarbonate, sodium hydroxide, potassium hydroxide, lithium hydroxide, ammonium hydroxide, magnesium hydroxide, calcium hydroxide, triethylamine, dimethylethanolamine (DMEA), sodium carbonate, lithium carbonate, lithium bicarbonate and combinations thereof.

The dispersion medium acts as a solvent for the neutralizing agent and other substances that will be introduced at a later stage, such as the free radical initiator. In some embodiments, the binder composition disclosed herein is prepared by an aqueous processing method, i.e., the dispersion medium is water.

In some embodiments, the dispersion medium can further comprise a hydrophilic solvent selected from the group consisting of ethanol, isopropanol, n-propanol, tert-butanol, n-butanol, dimethylacetamide (DMAc), dimethylformamide (DMF), N-methylpyrrolidone (NMP), methyl ethyl ketone (MEK), ethyl acetate (EA), butyl acetate (BA) and combinations thereof, in addition to water. In some embodiments, the dispersion medium is free of water, ethanol, isopropanol, n-propanol, tert-butanol, n-butanol, dimethylacetamide (DMAc), dimethylformamide (DMF), N-methylpyrrolidone (NMP), methyl ethyl ketone (MEK), ethyl acetate (EA) or butyl acetate (BA).

In some embodiments, a second suspension is formed by adding a monomer from which structural unit (a) is derived into the first suspension in step 102. In other embodiments, a second suspension is formed by adding a solution comprising a monomer from which structural unit (a) is derived into the first suspension. The solution comprising the monomer from which structural unit (a) is derived can be prepared by dissolving said monomer in water.

Structural unit (a) is derived from a monomer containing an acid group. In some embodiments, the acid group is selected from the group consisting of carboxylic acid, sulfonic acid, sulfuric acid, phosphonic acid, phosphoric acid, nitric acid, and combinations thereof. The acids listed above also include their salts and derivatives.

In some embodiments, the carboxylic acid is acrylic acid, methacrylic acid, crotonic acid, 2-butyl crotonic acid, cinnamic acid, maleic acid, maleic anhydride, fumaric acid, itaconic acid, itaconic anhydride, tetraconic acid or a combination thereof. In certain embodiments, the carboxylic acid is 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid or a combination thereof.

In some embodiments, the carboxylic acid is methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen malcate, octadecyl hydrogen maleate, fluoroalkyl hydrogen maleate or a combination thereof. In some embodiments, carboxylic acid is maleic anhydride, methyl maleic anhydride, dimethyl malcic anhydride, acrylic anhydride, methacrylic anhydride, methacrolein, methacryloyl chloride, methacryloyl fluoride, methacryloyl bromide, or a combination thereof.

In some embodiments, the sulfonic acid is vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy-1-propane sulfonic acid, or a combination thereof.

In some embodiments, the sulfuric acid is allyl hydrogen sulfate, vinyl hydrogensulfate, 4-allyl phenol sulphate, or a combination thereof.

In some embodiments, the phosphonic acid is vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl)phosphonic acid, ethylene 2-methacryloyloxyethyl phosphonic acid, ethyl-methacryloyloxyethyl phosphonic acid, or a combination thereof.

In some embodiments, the phosphoric acid is mono (2-acryloyloxyethyl) phosphate, mono (2-methacryloyloxyethyl) phosphate, diphenyl (2-acryloyloxyethyl) phosphate, diphenyl (2-methacryloyloxyethyl) phosphate, phenyl (2-acryloyloxyethyl) phosphate, phosphoxyethyl methacrylate, 3-chloro-2-phosphoryloxy propyl methacrylate, phosphoryloxy poly(ethylene glycol) monomethacrylate, phosphoryloxy poly(propylene glycol) methacrylate, (meth) acryloyloxyethyl phosphate, (meth)acryloyloxypropyl phosphate, (meth)acryloyloxy-2-hydroxypropyl phosphate. (meth)acryloyloxy-3-hydroxypropyl phosphate, (meth)acryloyloxy-3-chloro-2 hydroxypropyl phosphate, allyl hydrogen phosphate, vinyl hydrogen phosphate, allyl hydrogen pyrophosphate, vinyl hydrogen pyrophosphate, allyl hydrogen tripolyphosphate, vinyl hydrogen tripolyphosphate, allyl hydrogen tetrapolyphosphate, vinyl hydrogen tetrapolyphosphate, allyl hydrogen trimetaphosphate, vinyl hydrogen trimetaphosphate, isopentenyl phosphate, isopentenyl pyrophosphate, or a combination thereof.

In some embodiments, the nitric acid is allyl hydrogen nitrate, ethenyl hydrogen nitrate, or a combination thereof.

In some embodiments, the proportion of the monomer from which structural unit (a) is derived is from about 17% to about 57%, from about 17% to about 55%, from about 17% to about 53%, from about 17% to about 50%, from about 17% to about 47%, from about 17% to about 45%, from about 17% to about 43%, from about 17% to about 40%, from about 17% to about 37%, from about 17% to about 35%, from about 17% to about 33%, from about 17% to about 30%, from about 20% to about 57%, from about 20% to about 55%, from about 20% to about 53%, from about 20% to about 50%, from about 20% to about 47%, from about 20% to about 45%, from about 20% to about 43%, from about 20% to about 40%, from about 20% to about 37%, from about 20% to about 35%, from about 20% to about 33%, from about 20% to about 30%, from about 25% to about 57%, from about 25% to about 55%, from about 25% to about 53%, from about 25% to about 50%, from about 25% to about 47%, from about 25% to about 45%, from about 25% to about 43%, from about 25% to about 40%, from about 25% to about 37%, from about 25% to about 35%, from about 30% to about 57%, from about 30% to about 55%, from about 30% to about 53%, from about 30% to about 50%, from about 30% to about 47%, from about 30% to about 45%, from about 30% to about 43%, from about 30% to about 40%, from about 35% to about 57%, from about 35% to about 55%, from about 35% to about 53%, from about 35% to about 50%, from about 35% to about 47%, from about 35% to about 45%, from about 40% to about 57%, from about 40% to about 55%, from about 40% to about 53%, from about 40% to about 50%, from about 45% to about 57%, or from about 45% to about 55% by weight, based on the total weight of monomers added in the preparation of the binder composition.

In some embodiments, the proportion of the monomer from which structural unit (a) is derived is less than 57%, less than 55%, less than 53%, less than 50%, less than 47%, less than 45%, less than 43%, less than 40%, less than 37%, less than 35%, less than 33%, less than 30%, less than 27%, less than 25%, less than 23%, or less than 20% by weight, based on the total weight of monomers added in the preparation of the binder composition. In some embodiments, the proportion of the monomer from which structural unit (a) is derived is more than 17%, more than 20%, more than 23%, more than 25%, more than 27%, more than 30%, more than 33%, more than 35%, more than 37%, more than 40%, more than 43%, more than 45%, more than 47%, more than 50%, more than 53%, or more than 55% by weight, based on the total weight of monomers added in the preparation of the binder composition.

In some embodiments, each of the first suspension and the second suspension is independently stirred for a time period of from about 5 minutes to about 45 minutes, from about 5 minutes to about 40 minutes, from about 5 minutes to about 35 minutes, from about 10 minutes to about 35 minutes, from about 15 minutes to about 35 minutes, from about 20 minutes to about 35 minutes or from about 25 minutes to about 35 minutes. In some embodiments, each of the first suspension and the second suspension is independently stirred for a time period of less than 45 minutes, less than 40 minutes, less than 35 minutes, less than 30 minutes, less than 25 minutes, less than 20 minutes, less than 15 minutes or less than 10 minutes. In some embodiments, each of the first suspension and the second suspension is independently stirred for a time period of more than 5 minutes, more than 10 minutes, more than 15 minutes, more than 20 minutes, more than 25 minutes, more than 30 minutes, more than 35 minutes or more than 40 minutes.

In some embodiments, each of the first suspension and the second suspension is independently stirred at a speed of from about 10 rpm to about 600 rpm, from about 10 rpm to about 550 rpm, from about 10 rpm to about 500 rpm, from about 10 rpm to about 450 rpm, from about 10 rpm to about 400 rpm, from about 10 rpm to about 350 rpm, from about 10 rpm to about 300 rpm, from about 10 rpm to about 250 rpm, from about 10 rpm to about 200 rpm, from about 10 rpm to about 180 rpm, from about 10 rpm to about 160 rpm, from about 10 rpm to about 140 rpm, from about 10 rpm to about 120 rpm, from about 10 rpm to about 100 rpm, from about 20 rpm to about 100 rpm, from about 30 rpm to about 100 rpm or from about 40 rpm to about 100 rpm. In some embodiments, each of the first suspension and the second suspension is independently stirred at a speed of less than 600 rpm, less than 550 rpm, less than 500 rpm, less than 450 rpm, less than 400 rpm, less than 350 rpm, less than 300 rpm, less than 250 rpm, less than 200 rpm, less than 150 rpm, less than 100 rpm or less than 50 rpm. In some embodiments, each of the first suspension and the second suspension is independently stirred at a speed of more than 10 rpm, more than 50 rpm, more than 100 rpm, more than 150 rpm, more than 200 rpm, more than 250 rpm, more than 300 rpm, more than 350 rpm, more than 400 rpm, more than 450 rpm, more than 500 rpm or more than 550 rpm.

In some embodiments, the temperature of the second suspension is from about 20° C. to about 30° C. from about 20° C. to about 29° C., from about 20° C. to about 28° C., from about 20° C. to about 27° C., from about 20° C. to about 26° C., from about 20° C. to about 25° C., from about 21° C. to about 30° C., from about 22° C. to about 30° C., from about 23° C. to about 30° C. from about 24° C. to about 30° C., from about 25° C. to about 30° C. from about 22° C. to about 26° C. or from about 24° C. to about 28° C. In some embodiments, the temperature of the second suspension is less than 30° C., less than 29° C., less than 28° C., less than 27° C., less than 26° C., less than 25° C. less than 24° C. less than 23° C., less than 22° C. or less than 21° C. In some embodiments, the temperature of the second suspension is more than 20° C., more than 21° C. more than 22° C., more than 23° C., more than 24° C., more than 25° C., more than 26° C., more than 27° C., more than 28° C. or more than 29° C.

In some embodiments, a third suspension is formed by adding a monomer from which structural unit (b) is derived into the second suspension in step 103. In other embodiments, a third suspension is formed by adding a solution comprising a monomer from which structural unit (b) is derived into the second suspension. The solution comprising the monomer from which structural unit (b) is derived can be prepared by dissolving said monomer in water.

Structural unit (b) is derived from a monomer selected from the group consisting of an amide group-containing monomer, a hydroxyl group-containing monomer, and combinations thereof.

In some embodiments, the amide group-containing monomer is acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl) methacrylamide, N-(ethoxymethyl) methacrylamide, N-(propoxymethyl) methacrylamide, N-(butoxymethyl) methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide or a combination thereof.

In some embodiments, the hydroxyl group-containing monomer is an acrylate or methacrylate containing a $C_1$-$C_{20}$ alkyl group or $C_5$-$C_{20}$ cycloalkyl group that has a hydroxyl group. In some embodiments, the hydroxyl group-containing monomer is 2-hydroxyethylacrylate, 2-hydroxyethyl methacrylate, 2-hydroxypropyl acrylate, 2-hydroxypropyl methacrylate, 2-hydroxybutyl methacrylate, 3-hydroxypropylacrylate, 3-hydroxypropylmethacrylate, 4-hydroxybutyl methacrylate, 5-hydroxypentylacrylate, 6-hydroxyhexyl methacrylate, 1,4-cyclohexanedimethanol mono(meth)acrylate, 3-chloro-2-hydroxypropyl methacrylate, diethylene glycol mono(meth)acrylate, allyl alcohol, or a combination thereof.

In some embodiments, the proportion of the monomer from which structural unit (b) is derived is from about 4% to about 30%, from about 4% to about 29%, from about 4% to about 28%, from about 4% to about 27%, from about 4% to about 26%, from about 4% to about 25%, from about 4% to about 24%, from about 4% to about 23%, from about 4% to about 22%, from about 4% to about 21%, from about 4% to about 20%, from about 4% to about 19%, from about 4% to about 18%, from about 4% to about 17%, from about 4% to about 16%, from about 4% to about 15%, from about 4% to about 14%, from about 4% to about 13%, from about 4% to about 12%, from about 4% to about 11%, from about 4% to about 10%, from about 10% to about 30%, from about 10% to about 29%, from about 10% to about 28%, from about 10% to about 27%, from about 10% to about 26%, from about 10% to about 25%, from about 10% to about 24%, from about 10% to about 23%, from about 10% to about 22%, from about 10% to about 21%, from about 10% to about 20%, from about 15% to about 30%, from about 15% to about 29%, from about 15% to about 28%, from about 15% to about 27%, from about 15% to about 26%, from about 15% to about 25%, from about 20% to about 30%, from about 20% to about 29%, from about 20% to about 28%, from about 20% to about 27%, from about 20% to about 26%, from about 20% to about 25%, or from about 25% to about 30% by weight, based on the total weight of monomers added in the preparation of the binder composition.

In some embodiments, the proportion of the monomer from which structural unit (b) is derived is less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, or less than 5% by weight, based on the total weight of monomers added in the preparation of the binder composition. In some embodiments, the proportion of the monomer from which structural unit (b) is derived is more than 4%, more than 5%, more than 6%, more than 7%, more than 8%, more than 9%, more than 10%, more than 11%, more than 12%, more than 13%, more than 14%, more than 15%, more than 16%, more than 17%, more than 18%, more than 19%, more than 20%, more than 21%, more than 22%, more than 23%, more than 24%, more than 25%, more than 26%, more than 27%, more than 28%, or more than 29% by weight, based on the total weight of monomers added in the preparation of the binder composition.

In some embodiments, the third suspension is stirred for a time period of from about 5 minutes to about 60 minutes, from about 5 minutes to about 55 minutes, from about 5 minutes to about 50 minutes, from about 10 minutes to about 50 minutes, from about 15 minutes to about 50 minutes, from about 20 minutes to about 50 minutes, from about 25 minutes to about 50 minutes, from about 30 minutes to about 50 minutes or from about 35 minutes to about 50 minutes. In some embodiments, the third suspension is stirred for a time period of less than 60 minutes, less than 55 minutes, less than 50 minutes, less than 45 minutes, less than 40 minutes, less than 35 minutes, less than 30 minutes, less than 25 minutes, less than 20 minutes, less than 15 minutes or less than 10 minutes. In some embodiments, the third suspension is stirred for a time period of more than 5 minutes, more than 10 minutes, more than 15 minutes, more than 20 minutes, more than 25 minutes, more than 30 minutes, more than 35 minutes, more than 40 minutes, more than 45 minutes, more than 50 minutes or more than 55 minutes.

In some embodiments, the third suspension is stirred at a speed of from about 10 rpm to about 600 rpm, from about 10 rpm to about 550 rpm, from about 10 rpm to about 500 rpm, from about 10 rpm to about 450 rpm, from about 10 rpm to about 400 rpm, from about 10 rpm to about 350 rpm, from about 10 rpm to about 300 rpm, from about 10 rpm to about 250 rpm, from about 10 rpm to about 200 rpm, from about 10 rpm to about 180 rpm, from about 10 rpm to about 160 rpm, from about 10 rpm to about 140 rpm, from about 10 rpm to about 120 rpm, from about 10 rpm to about 100 rpm, from about 20 rpm to about 100 rpm, from about 30 rpm to about 100 rpm or from about 40 rpm to about 100 rpm. In some embodiments, the third suspension is stirred at a speed of less than 600 rpm, less than 550 rpm, less than 500 rpm, less than 450 rpm, less than 400 rpm, less than 350 rpm, less than 300 rpm, less than 250 rpm, less than 200 rpm, less than 150 rpm, less than 100 rpm or less than 50 rpm. In some embodiments, the third suspension is stirred at a speed of more than 10 rpm, more than 50 rpm, more than 100 rpm, more than 150 rpm, more than 200 rpm, more than 250 rpm, more than 300 rpm, more than 350 rpm, more than 400 rpm, more than 450 rpm, more than 500 rpm or more than 550 rpm.

In some embodiments, the temperature of the third suspension is elevated to from about 30° C. to about 70° C., from about 32° C. to about 70° C., from about 34° C. to about 70° C., from about 36° C. to about 70° C., from about 38° C. to about 70° C., from about 40° C. to about 70° C., from about 42° C. to about 70° C., from about 44° C. to about 70° C., from about 46° C. to about 70° C., from about 48° C. to about 70° C. or from about 50° C. to about 70° C.

In some embodiments, the temperature of the third suspension is elevated to less than 70° C., less than 68° C., less than 65° C., less than 62° C., less than 60° C., less than 58° C., less than 55° C., less than 52° C., less than 50° C., less than 48° C., less than 45° C., less than 42° C., less than 40° C., less than 38° C., or less than 35° C. In some embodiments, the temperature of the third suspension is elevated to more than 30° C., more than 32° C., more than 35° C., more than 38° C., more than 40° C., more than 42° C., more than 45° C., more than 48° C., more than 50° C., more than 52° C., more than 55° C., more than 58° C., more than 60° C., more than 62° C., or more than 65° C.

In some embodiments, a fourth suspension is formed by adding a monomer from which structural unit (c) is derived into the third suspension in step 104. In other embodiments, a fourth suspension is formed by adding solution comprising a monomer from which structural unit (c) is derived into the third suspension. The solution comprising the monomer from which structural unit (c) is derived can be prepared by dissolving said monomer in water.

Structural unit (c) is derived from a monomer selected from the group consisting of a nitrile group-containing monomer, an ether group-containing monomer, an epoxy group-containing monomer, a carbonyl group-containing monomer, a fluorine-containing monomer, and combinations thereof.

In some embodiments, the nitrile group-containing monomer includes α,β-ethylenically unsaturated nitrile monomers. In some embodiments, the nitrile group-containing monomer is acrylonitrile, α-halogenoacrylonitrile, α-alkylacrylonitrile or a combination thereof. In some embodiments, the nitrile group-containing monomer is α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl) acrylonitrile, α-(chlorophenyl) acrylonitrile, α-(cyanophenyl) acrylonitrile, vinylidene cyanide, or a combination thereof.

In some embodiments, the ether group-containing monomer is vinyl ether, allyl ether, allyl vinyl ether, allyl glycidyl ether, 2H-hexafluoro isopropyl allyl ether, hydroxypolyethoxy (10) allyl ether, allyl phenethyl ether, ethyl vinyl ether, propyl vinyl ether, n-butyl vinyl ether, or a combination thereof.

In some embodiments, the epoxy group-containing monomer is vinyl glycidyl ether, allyl glycidyl ether, allyl 2,3-epoxypropyl ether, butenyl glycidyl ether, butadiene monoepoxide, chloroprene monoepoxide, 3,4-epoxy-1-butene, 4,5-epoxy-2-pentene, 3,4-epoxy-1-vinylcyclohexane, 1,2-epoxy-4-vinylcyclohexane, 3,4-epoxy cyclohexylethylene, epoxy-4-vinylcyclohexene, 1,2-epoxy-5,9-cyclododecadiene, or a combination thereof. In some embodiments, the epoxy group-containing monomer is 1,2-epoxy-5-hexene, 1,2-epoxy-9-decene, glycidyl acrylate, glycidyl methacrylate, glycidyl crotonate, glycidyl 2,4-dimethyl pentenoate, glycidyl 4-hexenoate, glycidyl 4-heptenoate, glycidyl 5-methyl-4-heptenoate, glycidyl sorbate, glycidyl linoleate, glycidyl oleate, glycidyl 3-butenoate, glycidyl 3-pentenoate, glycidyl-4-methyl-3-pentenoate, or a combination thereof.

In some embodiments, the carbonyl group-containing monomer is methyl vinyl ketone, ethyl vinyl ketone, acrolein, acryloyl chloride, cinnamaldehyde, E-crotonaldehyde, 2-hexenal, oct-2-enal, 2-methylpent-2-enal, 4-methylpent-3-en-2-one, oct-1-en-3-one, 2-pentylbut-1-en-3-one, or a combination thereof.

In some embodiments, the fluorine-containing monomer is an acrylate or methacrylate containing a $C_1$-$C_{20}$ alkyl group or combinations thereof, wherein the monomer comprises at least one fluorine atom. In some embodiments, the fluorine-containing monomer is a perfluoro alkyl acrylate, such as perfluoro dodecyl acrylate, perfluoro n-octyl acrylate, perfluoro n-butyl acrylate, perfluoro hexylethyl acrylate and perfluoro octylethyl acrylate; perfluoro alkyl methacrylate such as perfluoro dodecyl methacrylate, perfluoro n-octyl methacrylate, perfluoro n-butyl methacrylate, perfluoro hexylethyl methacrylate and perfluoro octylethyl methacrylate; perfluoro oxyalkyl acrylate such as perfluoro dodecyloxyethyl acrylate and perfluoro decyloxyethyl acrylate; perfluoro oxyalkyl methacrylate such as perfluoro dodecyloxyethyl methacrylate and perfluoro decyloxyethyl methacrylate, or a combination thereof. In some embodiments, the fluorine-containing monomer is a carboxylate containing a $C_1$-$C_{20}$ alkyl group and at least one fluorine atom; wherein the carboxylate is selected from the group consisting of crotonate, malate, fumarate, itaconate, or combinations thereof. In some embodiments, the fluorine-containing monomer is vinyl fluoride, trifluoroethylene, trifluorochloroethylene, fluoroalkyl vinyl ether, perfluoroalkyl vinyl ether, hexafluoropropylene, 2,3,3,3-tetrafluoropropene, vinylidene fluoride, tetrafluoroethylene, 2-fluoro acrylate, or a combination thereof.

In certain embodiments, the proportion of the monomer from which structural unit (c) is derived from about 38% to about 58%, from about 38% to about 57%, from about 38% to about 56%, from about 38% to about 55%, from about 38% to about 54%, from about 38% to about 53%, from about 38% to about 52%, from about 38% to about 51%, from about 38% to about 50%, from about 38% to about 49%, from about 38% to about 48%, from about 40% to about 58%, from about 40% to about 57%, from about 40% to about 56%, from about 40% to about 55%, from about 40% to about 54%, from about 40% to about 53%, from about 40% to about 52%, from about 40% to about 51%, from about 40% to about 50%, from about 43% to about 58%, from about 43% to about 57%, from about 43% to about 56%, from about 43% to about 55%, from about 43% to about 54%, from about 43% to about 53%, from about 43% to about 52%, from about 43% to about 51%, from about 43% to about 50%, from about 45% to about 58%, from about 45% to about 57%, from about 45% to about 56%, from about 45% to about 55%, from about 45% to about 54%, from about 45% to about 53%, from about 45% to about 52%, from about 45% to about 51%, from about 45% to about 50%, from about 48% to about 58%, from about 48% to about 57%, from about 48% to about 56%, or from about 48% to about 55% by weight, based on the total weight of monomers added in the preparation of the binder composition.

In some embodiments, the proportion of the monomer from which structural unit (c) is derived is less than 58%, less than 57%, less than 56%, less than 55%, less than 54%, less than 53%, less than 52%, less than 51%, less than 50%, less than 49%, less than 48%, less than 47%, less than 46%, less than 45%, less than 44%, less than 43%, less than 42%, less than 41%, less than 40%, or less than 39% by weight, based on the total weight of monomers added in the preparation of the binder composition. In some embodiments, the proportion of the monomer from which structural unit (c) is derived is more than 38%, more than 39%, more than 40%, more than 41%, more than 42%, more than 43%, more than 44%, more than 45%, more than 46%, more than 47%, more than 48%, more than 49%, more than 50%, more than 51%, more than 52%, more than 53%, more than 54%, more than 55%, more than 56%, or more than 57% by weight, based on the total weight of monomers added in the preparation of the binder composition.

In certain embodiments the monomer from which structural unit (a) is derived, the monomer from which structural unit (b) is derived, the monomer from which structural unit (c) is derived or combinations thereof may be added into the first suspension to form a second suspension without forming the third suspension and the fourth suspension. In other embodiments, the monomer from which structural unit (a) is derived, the monomer which structural unit (b) is derived, the monomer from which structural unit (c) is derived or combinations thereof are added sequentially into the first suspension to form a second suspension, a third suspension or the fourth suspension. Stirring or dispersion may be employed between the additions. This is advantageous as it allows better dispersion of materials. In the case where the monomers are added sequentially, formation of the third suspension or the fourth suspension may be omitted.

In some embodiments, the fourth suspension is stirred for a time period of from about 5 minutes to about 30 minutes, from about 5 minutes to about 28 minutes, from about 5 minutes to about 26 minutes, from about 5 minutes to about 24 minutes, from about 5 minutes to about 22 minutes, from about 5 minutes to about 20 minutes, from about 5 minutes to about 18 minutes or from about 5 minutes to about 15 minutes. In some embodiments, the fourth suspension is stirred for a time period of less than 30 minutes, less than 28 minutes, less than 26 minutes, less than 24 minutes, less than 22 minutes, less than 20 minutes, less than 18 minutes, less than 16 minutes, less than 14 minutes, less than 12 minutes, less than 10 minutes or less than 8 minutes. In some embodiments, the fourth suspension is stirred for a time period of more than 5 minutes, more than 7 minutes, more than 10 minutes, more than 12 minutes, more than 14 minutes, more than 16 minutes, more than 18 minutes, more than 20 minutes, more than 22 minutes, more than 24 minutes, more than 26 minutes or more than 28 minutes.

In some embodiments, the fourth suspension is stirred at a speed of from about 10 rpm to about 600 rpm, from about 10 rpm to about 550 rpm, from about 10 rpm to about 500 rpm, from about 10 rpm to about 450 rpm, from about 10 rpm to about 400 rpm, from about 10 rpm to about 350 rpm, from about 10 rpm to about 300 rpm, from about 10 rpm to about 250 rpm, from about 10 rpm to about 200 rpm, from about 10 rpm to about 180 rpm, from about 10 rpm to about 160 rpm, from about 10 rpm to about 140 rpm, from about 10 rpm to about 120 rpm, from about 10 rpm to about 100 rpm, from about 20 rpm to about 100 rpm, from about 30 rpm to about 100 rpm or from about 40 rpm to about 100 rpm. In some embodiments, the fourth suspension is stirred at a speed of less than 600 rpm, less than 550 rpm, less than 500 rpm, less than 450 rpm, less than 400 rpm, less than 350 rpm, less than 300 rpm, less than 250 rpm, less than 200 rpm, less than 150 rpm, less than 100 rpm or less than 50 rpm. In some embodiments, the fourth suspension is stirred at a speed of more than 10 rpm, more than 50 rpm, more than 100 rpm, more than 150 rpm, more than 200 rpm, more than 250 rpm, more than 300 rpm, more than 350 rpm, more than 400 rpm, more than 450 rpm, more than 500 rpm or more than 550 rpm.

In some embodiments, the copolymer is obtained via polymerization of a mixture of monomers. In some embodiments, the mixture of monomers comprises a monomer from which structural unit (a) is derived, a monomer from which structural unit (b) is derived, and a monomer from which structural unit (c) is derived. In some embodiments, the first neutralizing agent added in step 101 neutralizes the acid group-containing monomer from which structural unit (a) is derived and transforms the acid group into a corresponding salt. Therefore, the salt can be a salt of the acids listed above that form the monomer from which structural unit (a) is derived.

In some embodiments, the salt contains an alkali metal cation. Examples of the alkali metal include lithium, sodium and potassium. In some embodiments, the salt contains an ammonium cation.

In some embodiments, with respect to the acid group-containing monomer in the composition, the molar ratio of the acid group to its corresponding salt is from about 0 to about 0.8, from about 0 to about 0.78, from about 0 to about 0.76, from about 0 to about 0.74, from about 0 to about 0.72, from about 0 to about 0.7, from about 0 to about 0.68, from about 0 to about 0.66, from about 0 to about 0.64, from about 0 to about 0.62, from about 0 to about 0.6, from about 0 to about 0.58, from about 0 to about 0.56, from about 0 to about 0.54, from about 0 to about 0.52, from about 0 to about 0.5, from about 0 to about 0.48, from about 0 to about 0.46, from about 0 to about 0.44, from about 0 to about 0.42, from about 0 to about 0.4, from about 0 to about 0.38, from about 0 to about 0.36, from about 0 to about 0.34, from about 0 to about 0.32, from about 0 to about 0.3, from about 0.02 to about 0.3, from about 0.04 to about 0.3, from about 0.06 to about 0.3, from about 0.08 to about 0.3, from about 0.1 to about 0.3, from about 0.05 to about 0.5 or from about 0.05 to about 0.4.

In some embodiments, with respect to the acid group-containing monomer in the composition, the molar ratio of the acid group to its corresponding salt is less than 0.8, less than 0.75, less than 0.7, less than 0.65, less than 0.6, less than 0.55, less than 0.5, less than 0.45, less than 0.4, less than 0.35, less than 0.3, less than 0.25, less than 0.2, less than 0.15, less than 0.1 or less than 0.05. In some embodiments, with respect to the acid group-containing monomer in the composition, the molar ratio of the acid group to its corresponding salt is more than 0, more than 0.05, more than 0.1, more than 0.15, more than 0.2, more than 0.25, more than 0.3, more than 0.35, more than 0.4, more than 0.45, more than 0.5, more than 0.55, more than 0.6, more than 0.65, more than 0.7 or more than 0.75.

In some embodiments, a fifth suspension is formed by adding an initiator solution into the fourth suspension in step 105. In some embodiments, the initiator solution is prepared by dissolving an initiator in water. In other embodiments, a fifth suspension is formed by adding portions of the initiator solution sequentially into the fourth suspension. Stirring or dispersion may be employed between the additions.

Polymerization occurred in the present invention follows the radical mechanism, wherein an initiator generates free radicals, leading to polymer chain propagation. The free radicals used herein can be produced using thermal decomposition or redox reactions. The free radical initiators disclosed herein are water-soluble.

The water-soluble free radical initiator decomposes thermally in the aqueous phase to give radicals which can initiate the polymerization. In some embodiments, the water-soluble initiator may be selected from the group consisting of persulfate-based initiators such as ammonium persulfate, sodium persulfate, potassium persulfate and the like; azo-based initiators such as azobis(isobutyl-amidine hydrochloride) (AIBA), 2,2'-azobis(2-methylpropionamidine) dihydrochloride, 2,2'-azobis(2-amidinopropane) dihydrochloride (AAPH), 2,2'-azobis [2-(2-imidazolin-2-yl) propane]dihydrochloride, bis [2-(4'-sulfophenyl) alkyl]-2,2'-azodiisobutyrate ammonium salts, 2,2'-azobis(N-2'-methylpropanoyl-2-amino-alkyl-1)-sulfonate and the like; peroxide-based initiators such as hydrogen peroxide, t-butyl hydroperoxide, succinic acid peroxide and the like; and combinations thereof.

In some embodiments, the water-soluble free radical initiator can be used together with a reducing agent to establish a redox initiator system. This allows generation of free radicals through an oxidation-reduction reaction at relatively low temperatures and improves the reaction rate of the polymerization.

In some embodiments, a reducing agent solution is prepared by dissolving the reducing agent in water. In some embodiments, the reducing agent can be selected from the group consisting of sodium bisulfite, sodium metabisulfite, sodium sulfite, sodium thiosulfate, thiourea dioxide, ferrous sulfate, ferrous chloride, ascorbic acid, citric acid, tartaric acid, erythorbic acid, glucose and metal salt of formaldehyde sulfoxylate, Bruggolite FF6M, and combinations thereof.

In some embodiments, when a redox initiator system is used, the molar ratio of the water-soluble free radical initiator to the reducing agent is from about 0.2 to about 10, from about 0.2 to about 9, from about 0.2 to about 8, from about 0.2 to about 7, from about 0.2 to about 6, from about 0.2 to about 5, from about 0.3 to about 5, from about 0.4 to about 5, from about 0.5 to about 5, from about 0.6 to about 5, from about 0.7 to about 5, from about 0.8 to about 5, from about 0.9 to about 5, from about 1 to about 5, from about 0.5 to about 4.5, from about 0.5 to about 4, from about 0.6 to about 3.5, from about 0.6 to about 3, from about 0.8 to about 3 or from about 0.2 to about 1.

In some embodiments, when a redox initiator system is used, the molar ratio of the water-soluble free radical initiator to the reducing agent is less than 10, less than 9, less than 8, less than 7, less than 6, less than 5, less than 4.8, less than 4.6, less than 4.4, less than 4.2, less than 4, less than 3.8, less than 3.6, less than 3.4, less than 3.2, less than 3, less than 2.8, less than 2.6, less than 2.4, less than 2.2, less than 2, less than 1.8, less than 1.6, less than 1.4, less than 1.2, less than 1, less than 0.8, less than 0.6 or less than 0.4. In some embodiments, when a redox initiator system is used, the molar ratio of the water-soluble free radical initiator to the reducing agent is more than 0.2, more than 0.4, more than 0.6, more than 0.8, more than 1, more than 1.2, more than 1.4, more than 1.6, more than 1.8, more than 2, more than 2.2, more than 2.4, more than 2.6, more than 2.8, more than 3, more than 3.2, more than 3.4, more than 3.6, more than 3.8, more than 4, more than 4.2, more than 4.4, more than 4.6, more than 4.8, more than 5, more than 6, more than 7, more than 8 or more than 9.

The polymerization temperature is dependent on the type of initiator applied. In some embodiments, the reaction temperature of the polymerization is from about 40° C. to about 80° C., from about 40° C. to about 78° C., from about 40° C. to about 75° C., from about 40° C. to about 72° C., from about 40° C. to about 70° C., from about 40° C. to about 68° C., from about 40° C. to about 65° C., from about 40° C. to about 62° C., from about 40° C. to about 60° C., from about 50° C. to about 80° C., from about 50° C. to about 78° C., from about 50° C. to about 75° C., from about 50° C. to about 72° C., from about 50° C. to about 70° C., from about 50° C. to about 68° C., from about 50° C. to about 65° C., from about 50° C. to about 62° C., from about 50° C. to about 60° C., from about 60° C. to about 80° C., from about 60° C. to about 78° C., from about 60° C. to about 75° C., from about 60° C. to about 72° C., from about 60° C. to about 70° C., from about 60° C. to about 68° C., or from about 60° C. to about 65° C. When the reaction temperature of the polymerization is within the above range, a higher reaction stability can be achieved and the binder composition exhibits a better overall binding performance.

In some embodiments, the reaction temperature of the polymerization is less than 80° C., less than 78° C., less than 75° C., less than 72° C., less than 70° C., less than 68° C., less than 65° C., less than 62° C., less than 60° C., less than 58° C., less than 55° C., less than 52° C., less than 50° C., less than 48° C., less than 45° C., or less than 42° C. In some embodiments, the reaction temperature of the polymerization is more than 40° C., more than 42° C., more than 45° C., more than 48° C., more than 50° C., more than 52° C., more than 55° C., more than 58° C., more than 60° C., more than 62° C., more than 65° C., more than 68° C., more than 70° C., more than 72° C., more than 75° C., or more than 78° C.

In some embodiments, the total reaction time of the polymerization is from about 5 hours to about 30 hours, from about 5 hours to about 28 hours, from about 5 hours to about 26 hours, from about 5 hours to about 24 hours, from about 5 hours to about 22 hours, from about 5 hours to about 20 hours, from about 5 hours to about 18 hours, from about 5 hours to about 16 hours, from about 5 hours to about 15 hours, from about 10 hours to about 30 hours, from about 10 hours to about 28 hours, from about 10 hours to about 26 hours, from about 10 hours to about 24 hours, from about 10 hours to about 22 hours, from about 10 hours to about 20 hours, from about 10 hours to about 18 hours, from about 10 hours to about 16 hours, from about 10 hours to about 15 hours, from about 15 hours to about 30 hours, from about 15 hours to about 28 hours, from about 15 hours to about 26 hours, from about 15 hours to about 24 hours, from about 15 hours to about 22 hours, from about 15 hours to about 20 hours, from about 20 hours to about 30 hours, from about 20 hours to about 28 hours, from about 20 hours to about 26 hours, or from about 20 hours to about 24 hours.

In some embodiments, the total reaction time of the polymerization is less than 30 hours, less than 28 hours, less than 26 hours, less than 24 hours, less than 22 hours, less than 20 hours, less than 18 hours, less than 16 hours, less than 15 hours, less than 14 hours, less than 12 hours, or less than 10 hours. In some embodiments, the total reaction time of the polymerization is more than 5 hours, more than 6 hours, more than 8 hours, more than 10 hours, more than 12 hours, more than 14 hours, more than 15 hours, more than 16 hours, more than 18 hours, more than 20 hours, more than 22 hours, more than 24 hours, or more than 26 hours.

In some embodiments, the fifth suspension is stirred for a time period of from about 5 hours to about 30 hours, from about 5 hours to about 28 hours, from about 5 hours to about 26 hours, from about 5 hours to about 24 hours, from about 5 hours to about 22 hours, from about 5 hours to about 20 hours, from about 5 hours to about 18 hours, from about 5 hours to about 16 hours, from about 5 hours to about 15 hours, from about 10 hours to about 30 hours, from about 10 hours to about 28 hours, from about 10 hours to about 26 hours, from about 10 hours to about 24 hours, from about 10 hours to about 22 hours, from about 10 hours to about 20 hours, from about 10 hours to about 18 hours, from about 10 hours to about 16 hours, from about 10 hours to about 15 hours, from about 15 hours to about 30 hours, from about 15 hours to about 28 hours, from about 15 hours to about 26 hours, from about 15 hours to about 24 hours, from about 15 hours to about 22 hours, from about 15 hours to about 20 hours, from about 20 hours to about 30 hours, from about 20 hours to about 28 hours, from about 20 hours to about 26 hours, or from about 20 hours to about 24 hours.

In some embodiments, the fifth suspension is stirred for a time period of less than 30 hours, less than 28 hours, less than 26 hours, less than 24 hours, less than 22 hours, less than 20 hours, less than 18 hours, less than 16 hours, less than 15 hours, less than 14 hours, less than 12 hours, or less than 10 hours. In some embodiments, the fifth suspension is stirred for a time period of more than 5 hours, more than 6 hours, more than 8 hours, more than 10 hours, more than 12 hours, more than 14 hours, more than 15 hours, more than 16 hours, more than 18 hours, more than 20 hours, more than 22 hours, more than 24 hours, or more than 26 hours.

In some embodiments, the fifth suspension is stirred at a speed of from about 20 rpm to about 300 rpm, from about 20 rpm to about 280 rpm, from about 20 rpm to about 260 rpm, from about 20 rpm to about 240 rpm, from about 20 rpm to about 220 rpm, from about 20 rpm to about 200 rpm, from about 20 rpm to about 180 rpm, from about 20 rpm to about 160 rpm, from about 40 rpm to about 160 rpm, from about 60 rpm to about 160 rpm, from about 60 rpm to about 140 rpm, from about 80 rpm to about 140 rpm, from about 80 rpm to about 120 rpm, from about 50 rpm to about 150 rpm or from about 50 rpm to about 200 rpm.

In some embodiments, the fifth suspension is stirred at a speed of less than 300 rpm, less than 280 rpm, less than 260 rpm, less than 240 rpm, less than 220 rpm, less than 200 rpm, less than 180 rpm, less than 160 rpm, less than 140 rpm, less than 120 rpm, less than 100 rpm, less than 80 rpm, less than 60 rpm or less than 40 rpm. In some embodiments, the fifth suspension is stirred at a speed of more than 20 rpm, more than 40 rpm, more than 60 rpm, more than 80 rpm, more than 100 rpm, more than 120 rpm, more than 140 rpm, more than 160 rpm, more than 180 rpm, more than 200 rpm, more than 220 rpm, more than 240 rpm, more than 260 rpm or more than 280 rpm.

In some embodiments, the proportion of water-soluble free radical initiator is from about 0.01% to about 0.5%, from about 0.02% to about 0.5%, from about 0.03% to about 0.5%, from about 0.04% to about 0.5%, from about 0.05% to about 0.5%, from about 0.06% to about 0.5%, from about 0.08% to about 0.5%, from about 0.1% to about 0.5%, from about 0.12% to about 0.5%, from about 0.15% to about 0.5%, from about 0.18% to about 0.5%, from about 0.2% to about 0.5%, from about 0.01% to about 0.36%, from about 0.02% to about 0.36%, from about 0.03% to about 0.36%, from about 0.04% to about 0.36%, from about 0.05% to about 0.36%, from about 0.06% to about 0.36%, from about 0.08% to about 0.36%, from about 0.1% to about 0.36%, from about 0.12% to about 0.36%, from about 0.14% to about 0.36%, from about 0.16% to about 0.36%, from about 0.18% to about 0.36%, from about 0.2% to about 0.36%, from about 0.01% to about 0.2%, from about 0.02% to about 0.2%, from about 0.03% to about 0.2%, from about 0.04% to about 0.2%, from about 0.05% to about 0.2%, from about 0.06% to about 0.2%, from about 0.08% to about 0.2%, from about 0.1% to about 0.2%, from about 0.01% to about 0.1%, from about 0.02% to about 0.1%, from about 0.03% to about 0.1%, from about 0.04% to about 0.1%, from about 0.05% to about 0.1%, from about 0.06% to about 0.1%, or from about 0.08% to about 0.1% by weight, based on the total weight of monomers added in the preparation of the binder composition. When the proportion of the water-soluble initiator is within the above range, a higher monomer conversion rate can be achieved and the binder composition exhibits a better overall binding performance.

In some embodiments, the proportion of water-soluble free radical initiator is less than 0.5%, less than 0.45%, less than 0.4%, less than 0.35%, less than 0.30%, less than 0.25%, less than 0.2%, less than 0.18%, less than 0.16%, less than 0.15%, less than 0.14%, less than 0.12%, less than 0.1%, less than 0.08%, less than 0.06%, less than 0.05%, less than 0.04%, or less than 0.03% by weight, based on the total weight of monomers added in the preparation of the binder composition. In some embodiments, the proportion of water-soluble free radical initiator is more than 0.01%, more than 0.02%, more than 0.03%, more than 0.04%, more than 0.05%, more than 0.06%, more than 0.08%, more than 0.1%, more than 0.12%, more than 0.14%, more than 0.15%, more than 0.16%, more than 0.18%, more than 0.2%, more than 0.25%, more than 0.30%, more than 0.35%, or more than 0.4% by weight, based on the total weight of monomers added in the preparation of the binder composition.

In some embodiments, the proportion of reducing agent is from about 0.001% to about 0.03%, from about 0.002% to about 0.03%, from about 0.005% to about 0.03%, from about 0.008% to about 0.03%, from about 0.01% to about 0.03%, from about 0.012% to about 0.03%, from about 0.015% to about 0.03%, from about 0.001% to about 0.028%, from about 0.002% to about 0.028%, from about 0.005% to about 0.028%, from about 0.008% to about 0.028%, from about 0.01% to about 0.028%, from about 0.012% to about 0.028%, from about 0.015% to about 0.028%, from about 0.001% to about 0.025%, from about 0.002% to about 0.025%, from about 0.005% to about 0.025%, from about 0.008% to about 0.025%, from about 0.01% to about 0.025%, from about 0.012% to about 0.025%, from about 0.015% to about 0.025%, from about 0.001% to about 0.022%, from about 0.002% to about 0.022%, from about 0.005% to about 0.022%, from about 0.008% to about 0.022%, from about 0.01% to about 0.022%, from about 0.012% to about 0.022%, from about 0.001% to about 0.02%, from about 0.002% to about 0.02%, from about 0.005% to about 0.02%, from about 0.008% to about 0.02%, from about 0.01% to about 0.02%, from about 0.001% to about 0.018%, from about 0.002% to about 0.018%, from about 0.005% to about 0.018%, from about 0.008% to about 0.018%, from about 0.001% to about 0.015%, from about 0.002% to about 0.015%, or from about 0.005% to about 0.015% by weight, based on the total weight of monomers added in the preparation of the binder composition.

In some embodiments, the proportion of reducing agent is less than 0.03%, less than 0.029%, less than 0.028%, less than 0.027%, less than 0.026%, less than 0.025%, less than 0.024%, less than 0.023%, less than 0.022%, less than 0.021%, less than 0.02%, less than 0.019%, less than 0.018%, less than 0.017%, less than 0.016%, less than 0.015%, less than 0.014%, less than 0.013%, less than 0.012%, less than 0.011%, less than 0.01%, less than 0.008%, or less than 0.005% by weight, based on the total weight of monomers added in the preparation of the binder composition. In some embodiments, the proportion of reducing agent is more than 0.001%, more than 0.002%, more than 0.005%, more than 0.006%, more than 0.007%, more than 0.008%, more than 0.009%, more than 0.01%, more than 0.011%, more than 0.012%, more than 0.013%, more than 0.014%, more than 0.015%, more than 0.016%, more than 0.017%, more than 0.018%, more than 0.019%, more than 0.02%, more than 0.021%, more than 0.022%, more than 0.023%, more than 0.024%, more than 0.025%, more than 0.026%, more than 0.027%, or more than 0.028% by weight, based on the total weight of monomers added in the preparation of the binder composition.

In some embodiments, a sixth suspension is formed by adding a second neutralizing solution dropwise into the fifth suspension in step 106. In some embodiments, the second neutralizing solution is prepared by dissolving a second neutralizing agent in water. In some embodiments, the first neutralizing agent is the same as the second neutralizing agent. In some embodiments, the first and second neutralizing agents are not the same.

In some embodiments, the temperature of the fifth suspension is lowered to a temperature from about 20° C. to about 40° C., from about 20° C. to about 39° C., from about 20° C. to about 38° C., from about 20° C. to about 37° C. from about 20° C. to about 36° C. from about 20° C. to about 35° C. from about 20° C. to about 34° C. from about 20° C.

to about 33° C., from about 20° C. to about 32° C., from about 20° C. to about 31° C., from about 20° C. to about 30° C., from about 21° C. to about 35° C., from about 22° C. to about 35° C., from about 23° C. to about 35° C., from about 24° C. to about 35° C. or from about 25° C. to about 35° C., prior to adding the second neutralizing solution to form a sixth suspension. In some embodiments, the temperature of the fifth suspension is lowered to less than 40° C., less than 39° C., less than 38° C., less than 37° C., less than 36° C., less than 35° C., less than 34° C., less than 33° C., less than 32° C., less than 31° C. less than 30° C. less than 29° C., less than 28° C., less than 27° C., less than 26° C., less than 25° C. less than 24° C., less than 23° C., less than 22° C. or less than 21° C., prior to adding the second neutralizing solution to form a sixth suspension. In some embodiments, the temperature of the fifth suspension is lowered to more than 20° C., more than 21° C., more than 22° C., more than 23° C. more than 24° C., more than 25° C., more than 26° C., more than 27° C., more than 28° C., more than 29° C., more than 30° C., more than 31° C., more than 32° C., more than 33° C., more than 34° C., more than 35° C., more than 36° C., more than 37° C., more than 38° C. or more than 39° C. prior to adding the second neutralizing solution to form a sixth suspension.

In some embodiments, the total proportion of the second neutralizing agent is from about 15% to about 60%, from about 15% to about 58%, from about 15% to about 55%, from about 15% to about 52%, from about 15% to about 50%, from about 15% to about 48%, from about 15% to about 45%, from about 15% to about 42%, from about 15% to about 40%, from about 15% to about 38%, from about 15% to about 35%, from about 15% to about 32%, from about 15% to about 30%, from about 20% to about 60%, from about 20% to about 58%, from about 20% to about 55%, from about 20% to about 52%, from about 20% to about 50%, from about 20% to about 48%, from about 20% to about 45%, from about 20% to about 42%, from about 20% to about 40%, from about 20% to about 38%, from about 20% to about 35%, from about 25% to about 60%, from about 25% to about 50%, from about 25% to about 48%, from about 25% to about 45%, from about 25% to about 42%, from about 25% to about 40%, from about 25% to about 38%, from about 25% to about 35%, from about 30% to about 60%, from about 30% to about 50%, from about 30% to about 48%, from about 30% to about 45%, from about 30% to about 42%, or from about 30% to about 40% by mole, based on the total number of moles of monomeric units in the copolymer in the binder composition.

In some embodiments, the total proportion of the second neutralizing agent is less than 60%, less than 58%, less than 55%, less than 52%, less than 50%, less than 48%, less than 45%, less than 42%, less than 40%, less than 38%, less than 35%, less than 32%, less than 30%, less than 28%, less than 25%, less than 22%, less than 20%, or less than 18% by mole, based on the total number of moles of monomeric units in the copolymer in the binder composition. In some embodiments, the total proportion of the second neutralizing agent is more than 15%, more than 18%, more than 20%, more than 22%, more than 25%, more than 28%, more than 30%, more than 32%, more than 35%, more than 38%, more than 40%, more than 42%, more than 45%, more than 48%, more than 50%, more than 52%, more than 55%, or more than 58% by mole, based on the total number of moles of monomeric units in the copolymer in the binder composition.

In some embodiments, the second neutralizing solution is added into the fifth suspension dropwise. In some embodiments, the second neutralizing solution is added dropwise into the fifth suspension over a time period of from about 15 minutes to about 120 minutes, from about 20 minutes to about 120 minutes, from about 30 minutes to about 120 minutes, from about 40 minutes to about 120 minutes, from about 50 minutes to about 120 minutes, from about 60 minutes to about 120 minutes, from about 15 minutes to about 90 minutes, from about 20 minutes to about 90 minutes, from about 30 minutes to about 90 minutes, from about 40 minutes to about 90 minutes, from about 45 minutes to about 90 minutes, from about 50 minutes to about 90 minutes, from about 15 minutes to about 60 minutes, from about 20 minutes to about 60 minutes, or from about 30 minutes to about 60 minutes. In some embodiments, the second neutralizing solution is added dropwise into the fifth suspension over a time period of less than 120 minutes, less than 110 minutes, less than 100 minutes, less than 90 minutes, less than 80 minutes, less than 70 minutes, less than 60 minutes, less than 50 minutes, less than 40 minutes, less than 30 minutes or less than 20 minutes. In some embodiments, the second neutralizing solution is added dropwise into the fifth suspension over a time period of more than 15 minutes, more than 20 minutes, more than 30 minutes, more than 40 minutes, more than 50 minutes, more than 60 minutes, more than 70 minutes, more than 80 minutes, or more than 90 minutes.

In some embodiments, after the addition of the second neutralizing solution has begun, the fifth suspension is stirred for a time period of from about 1 hour to about 6 hours, from about 1 hour to about 5.5 hours, from about 1 hour to about 5 hours, from about 1 hour to about 4.5 hours, from about 1 hour to about 4 hours, from about 1 hours to about 3.5 hours, from about 1 hours to about 3 hours, from about 1.5 hours to about 6 hours, from about 1.5 hours to about 5.5 hours, from about 1.5 hours to about 5 hours, from about 1.5 hours to about 4.5 hours, from about 1.5 hours to about 4 hours, from about 1.5 hours to about 3.5 hours, from about 1.5 hours to about 3 hours, from about 2 hours to about 6 hours, from about 2 hours to about 5.5 hours, from about 2 hours to about 5 hours, from about 2 hours to about 4.5 hours, or from about 2 hours to about 4 hours.

In some embodiments, after the addition of the second neutralizing solution has begun, the fifth suspension is stirred for a time period of less than 6 hours, less than 5.5 hours, less than 5 hours, less than 4.5 hours, less than 4 hours, less than 3.5 hours, less than 3 hours, less than 2.5 hours, less than 2 hours, or less than 1.5 hours. In some embodiments, after the addition of the second neutralizing solution has begun, the fifth suspension is stirred for a time period of more than 1 hour, more than 1.5 hours, more than 2 hours, more than 2.5 hours, more than 3 hours, more than 3.5 hours, more than 4 hours, more than 4.5 hours, more than 5 hours, more than 5.25 hours, or more than 5.5 hours.

In some embodiments, the fifth suspension is stirred at a speed of from about 20 rpm to about 300 rpm, from about 20 rpm to about 280 rpm, from about 20 rpm to about 260 rpm, from about 20 rpm to about 240 rpm, from about 20 rpm to about 220 rpm, from about 20 rpm to about 200 rpm, from about 20 rpm to about 180 rpm, from about 20 rpm to about 160 rpm, from about 40 rpm to about 160 rpm, from about 60 rpm to about 160 rpm, from about 60 rpm to about 140 rpm, from about 80 rpm to about 140 rpm, from about 80 rpm to about 120 rpm, from about 50 rpm to about 150 rpm or from about 50 rpm to about 200 rpm.

In some embodiments, the fifth suspension is stirred at a speed of less than 300 rpm, less than 280 rpm, less than 260 rpm, less than 240 rpm, less than 220 rpm, less than 200 rpm, less than 180 rpm, less than 160 rpm, less than 140 rpm, less than 120 rpm, less than 100 rpm, less than 80 rpm, less than 60 rpm or less than 40 rpm. In some embodiments, the fifth suspension is stirred at a speed of more than 20 rpm, more than 40 rpm, more than 60 rpm, more than 80 rpm, more than 100 rpm, more than 120 rpm, more than 140 rpm, more than 160 rpm, more than 180 rpm, more than 200 rpm, more than 220 rpm, more than 240 rpm, more than 260 rpm or more than 280 rpm.

In some embodiments, a binder composition is formed by filtering the sixth suspension in step 107.

The purpose of adding the first and second neutralizing agents in steps 101 and 106 respectively is to neutralize the acid group-containing monomer in order to produce a binder composition that is slightly alkaline in nature. Exposing the binder composition to acidic conditions is undesirable as this may disrupt the dispersion of the binder composition.

After neutralization, the acid groups in structural unit (a) of the copolymer may be partially or wholly converted to their corresponding salts. In some embodiments, the salt contains an alkali metal cation. Examples of the alkali metal include lithium, sodium and potassium. In some embodiments, the salt contains an ammonium cation.

In some embodiments, with respect to the copolymer after neutralization, the molar ratio of the acid groups to their corresponding salts is from about 0 to about 0.2, from about 0 to about 0.19, from about 0 to about 0.18, from about 0 to about 0.17, from about 0 to about 0.16, from about 0 to about 0.15, from about 0 to about 0.14, from about 0 to about 0.13, from about 0 to about 0.12, from about 0 to about 0.11, from about 0 to about 0.1, from about 0 to about 0.09, from about 0 to about 0.08, from about 0 to about 0.07, from about 0 to about 0.06, from about 0 to about 0.05, from about 0.01 to about 0.1, from about 0.02 to about 0.12 or from about 0.01 to about 0.15.

In some embodiments, with respect to the copolymer after neutralization, the molar ratio of the acid groups to their corresponding salts is less than 0.2, less than 0.19, less than 0.18, less than 0.17, less than 0.16, less than 0.15, less than 0.14, less than 0.13, less than 0.12, less than 0.11, less than 0.1, less than 0.09, less than 0.08, less than 0.07, less than 0.06, less than 0.05, less than 0.04, less than 0.03 or less than 0.02. In some embodiments, with respect to the copolymer after neutralization, the molar ratio of the acid groups to their corresponding salts is more than 0, more than 0.01, more than 0.02, more than 0.03, more than 0.04, more than 0.05, more than 0.06, more than 0.07, more than 0.08, more than 0.09, more than 0.1, more than 0.11, more than 0.12, more than 0.13, more than 0.14, more than 0.15, more than 0.16, more than 0.17 or more than 0.18.

In some embodiments, the proportion of structural unit (a) in the copolymer is from about 15% to about 50%, from about 15% to about 48%, from about 15% to about 45%, from about 15% to about 42%, from about 15% to about 40%, from about 15% to about 38%, from about 15% to about 35%, from about 15% to about 32%, from about 15% to about 30%, from about 15% to about 28%, from about 15% to about 25%, from about 20% to about 50%, from about 20% to about 48%, from about 20% to about 45%, from about 20% to about 42%, from about 20% to about 40%, from about 20% to about 38%, from about 20% to about 35%, from about 20% to about 32%, from about 20% to about 30%, from about 25% to about 50%, from about 25% to about 48%, from about 25% to about 45%, from about 25% to about 42%, from about 25% to about 40%, from about 25% to about 38%, from about 25% to about 35%, from about 30% to about 50%, from about 30% to about 48%, from about 30% to about 45%, from about 30% to about 42%, or from about 30% to about 40% by mole, based on the total number of moles of monomeric units in the copolymer in the binder composition.

In some embodiments, the proportion of structural unit (a) in the copolymer is less than 50%, less than 48%, less than 45%, less than 42%, less than 40%, less than 38%, less than 35%, less than 32%, less than 30%, less than 28%, less than 25%, less than 22%, less than 20%, or less than 18% by mole, based on the total number of moles of monomeric units in the copolymer in the binder composition. In some embodiments, the proportion of structural unit (a) in the copolymer is more than 15%, more than 18%, more than 20%, more than 22%, more than 25%, more than 28%, more than 30%, more than 32%, more than 35%, more than 38%, more than 40%, more than 42%, more than 45%, or more than 48% by mole, based on the total number of moles of monomeric units in the copolymer in the binder composition.

In some embodiments, the proportion of structural unit (b) in the copolymer is from about 4% to about 25%, from about 4% to about 24%, from about 4% to about 23%, from about 4% to about 22%, from about 4% to about 21%, from about 4% to about 20%, from about 4% to about 19%, from about 4% to about 18%, from about 4% to about 17%, from about 4% to about 16%, from about 4% to about 15%, from about 4% to about 14%, from about 4% to about 13%, from about 7% to about 25%, from about 7% to about 24%, from about 7% to about 23%, from about 7% to about 22%, from about 7% to about 21%, from about 7% to about 20%, from about 7% to about 19%, from about 7% to about 18%, from about 7% to about 17%, from about 7% to about 16%, from about 7% to about 15%, from about 10% to about 25%, from about 10% to about 24%, from about 10% to about 23%, from about 10% to about 22%, from about 10% to about 21%, from about 10% to about 20%, from about 10% to about 19%, from about 10% to about 18%, from about 10% to about 17%, from about 10% to about 16%, from about 10% to about 15%, from about 13% to about 25%, from about 13% to about 24%, from about 13% to about 23%, from about 13% to about 22%, from about 13% to about 21%, from about 13% to about 20%, from about 15% to about 25%, from about 15% to about 24%, from about 15% to about 23%, from about 15% to about 22%, from about 15% to about 21%, or from about 15% to about 20% by mole, based on the total number of moles of monomeric units in the copolymer in the binder composition.

In some embodiments, the proportion of structural unit (b) in the copolymer is less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, or less than 5% by mole, based on the total number of moles of monomeric units in the copolymer in the binder composition. In some embodiments, the proportion of structural unit (b) in the copolymer is more than 4%, more than 5%, more than 6%, more than 7%, more than 8%, more than 9%, more than 10%, more than 11%, more than 12%, more than 13%, more than 14%, more than 15%, more than 16%, more than 17%, more than 18%, more than 19%, more than 20%, more than 21%, more than 22%, more than 23%, or more than 24% by mole, based on the total number of moles of monomeric units in the copolymer in the binder composition.

In some embodiments, the proportion of structural unit (c) in the copolymer is from about 46% to about 65%, from about 46% to about 64%, from about 46% to about 63%, from about 46% to about 62%, from about 46% to about 61%, from about 46% to about 60%, from about 46% to about 59%, from about 46% to about 58%, from about 46% to about 57%, from about 46% to about 56%, from about 50% to about 65%, from about 50% to about 64%, from about 50% to about 63%, from about 50% to about 62%, from about 50% to about 61%, from about 50% to about 60%, from about 50% to about 59%, from about 50% to about 58%, from about 50% to about 57%, from about 50% to about 56%, from about 55% to about 65%, from about 55% to about 64%, from about 55% to about 63%, from about 55% to about 62%, from about 55% to about 61%, or from about 55% to about 60% by mole, based on the total number of moles of monomeric units in the copolymer in the binder composition.

In some embodiments, the proportion of structural unit (c) in the copolymer is less than 65%, less than 64%, less than 63%, less than 62%, less than 61%, less than 60%, less than 59%, less than 58%, less than 57%, less than 56%, less than 55%, less than 54%, less than 53%, less than 52%, less than 51%, less than 50%, less than 49%, less than 48%, or less than 47% by mole, based on the total number of moles of monomeric units in the copolymer in the binder composition. In some embodiments, the proportion of structural unit (c) in the copolymer is more than 46%, more than 47%, more than 48%, more than 49%, more than 50%, more than 51%, more than 52%, more than 53%, more than 54%, more than 55%, more than 56%, more than 57%, more than 58%, more than 59%, more than 60%, more than 61%, more than 62%, more than 63%, or more than 64% by mole, based on the total number of moles of monomeric units in the copolymer in the binder composition.

In some embodiments, structural unit (a) and structural unit (b) constitute a hydrophilic portion of the copolymer. In some embodiments, structural unit (c) constitutes a hydrophobic portion of the copolymer.

In some embodiments, the proportion of the sum of structural unit (a) and structural unit (b) within the copolymer is from about 35% to about 54%, from about 35% to about 53%, from about 35% to about 52%, from about 35% to about 51%, from about 35% to about 50%, from about 35% to about 49%, from about 35% to about 48%, from about 35% to about 47%, from about 35% to about 46%, from about 35% to about 45%, from about 38% to about 54%, from about 38% to about 53%, from about 38% to about 52%, from about 38% to about 51%, from about 38% to about 50%, from about 38% to about 49%, from about 38% to about 48%, from about 38% to about 47%, from about 38% to about 46%, from about 38% to about 45%, from about 40% to about 54%, from about 40% to about 53%, from about 40% to about 52%, from about 40% to about 51%, from about 40% to about 50%, from about 40% to about 49%, from about 40% to about 48%, from about 40% to about 47%, from about 40% to about 46%, from about 40% to about 45%, from about 42% to about 54%, from about 42% to about 53%, from about 42% to about 52%, from about 42% to about 51%, from about 42% to about 50%, from about 42% to about 49%, from about 42% to about 48%, from about 45% to about 54%, from about 45% to about 53%, from about 45% to about 52%, from about 45% to about 51%, or from about 45% to about 50% by mole, based on the total number of moles of monomeric units in the copolymer in the binder composition.

In some embodiments, the proportion of the sum of structural unit (a) and structural unit (b) within the copolymer is less than 54%, less than 53%, less than 52%, less than 51%, less than 50%, less than 49%, less than 48%, less than 47%, less than 46%, less than 45%, less than 44%, less than 43%, less than 42%, less than 41%, less than 40%, less than 39%, less than 38%, less than 37%, or less than 36% by mole, based on the total number of moles of monomeric units in the copolymer in the binder composition. In some embodiments, the proportion of the sum of structural unit (a) and structural unit (b) within the copolymer is more than 35%, more than 36%, more than 37%, more than 38%, more than 39%, more than 40%, more than 41%, more than 42%, more than 43%, more than 44%, more than 45%, more than 46%, more than 47%, more than 48%, more than 49%, more than 50%, more than 51%, more than 52%, or more than 53% by mole, based on the total number of moles of monomeric units in the copolymer in the binder composition.

When the proportion of the sum of structural unit (a) and structural unit (b) within the copolymer of the binder composition is too high, it becomes more difficult to process the binder composition and slurries containing it. Moreover, electrodes produced from such slurries have been found to crack easily, causing their batteries to have poor electrochemical performance. On the other hand, when the proportion of the sum of structural unit (a) and structural unit (b) within the copolymer of the binder composition is too low, dispersion of the binder composition within the slurry is poor, which also damages the electrochemical performance of the batteries. Accordingly, the proportion of the sum of structural unit (a) and structural unit (b) within the copolymer of the binder composition is critical.

In some embodiments, the molar ratio of the sum of the structural unit (a) and structural unit (b) to the structural unit (c) in the copolymer is from about 0.5 to about 1.2, from about 0.5 to about 1.15, from about 0.5 to about 1.1, from about 0.5 to about 1.05, from about 0.5 to about 1, from about 0.5 to about 0.95, from about 0.5 to about 0.9, from about 0.5 to about 0.85, from about 0.5 to about 0.8, from about 0.5 to about 0.75, from about 0.5 to about 0.7, from about 0.65 to about 1.2, from about 0.65 to about 1.15, from about 0.65 to about 1.1, from about 0.65 to about 1.05, from about 0.65 to about 1, from about 0.65 to about 0.95, from about 0.65 to about 0.9, from about 0.65 to about 0.85, from about 0.65 to about 0.8, from about 0.65 to about 0.75, from about 0.8 to about 1.2, from about 0.8 to about 1.15, from about 0.8 to about 1.1, from about 0.8 to about 1.05, from about 0.8 to about 1, from about 0.9 to about 1.2, from about 0.9 to about 1.15, from about 0.9 to about 1.1, from about 0.9 to about 1.05, or from about 0.9 to about 1.

In some embodiments, the molar ratio of the sum of the structural unit (a) and structural unit (b) to the structural unit (c) in the copolymer is less than 1.2, less than 1.15, less than 1.1, less than 1.05, less than 1, less than 0.95, less than 0.9, less than 0.85, less than 0.8, less than 0.75, less than 0.7, less than 0.65, less than 0.6, or less than 0.55. In some embodiments, the molar ratio of the sum of the structural unit (a) and structural unit (b) to the structural unit (c) in the copolymer is more than 0.5, more than 0.55, more than 0.6, more than 0.65, more than 0.7, more than 0.75, more than 0.8, more than 0.85, more than 0.9, more than 0.95, more than 1, more than 1.05, more than 1.1, or more than 1.15.

Addition of an ester group-containing monomer in the preparation of the binder composition disclosed herein is found to result in a deterioration in electrochemical performance. In some embodiments, the binder composition is free of a structural unit derived from an ester group-containing monomer. In some embodiments, the ester group-containing monomer is $C_1$-$C_{20}$ alkyl acrylate, $C_1$-$C_{20}$ alkyl methacrylate, cycloalkyl acrylate or a combination thereof. In some embodiments, the ester group-containing monomer is methyl acrylate, ethyl acrylate, n-propyl acrylate, isopropyl acrylate, n-butyl acrylate, sec-butyl acrylate, tert-butyl acrylate, pentyl acrylate, hexyl acrylate, heptyl acrylate, octyl acrylate, 3,3,5-trimethylhexyl acrylate, 2-ethylhexyl acrylate, nonyl acrylate, decyl acrylate, lauryl acrylate, n-tetradecyl acrylate, octadecyl acrylate, cyclohexyl acrylate, phenyl acrylate, methoxymethyl acrylate, methoxyethyl acrylate, ethoxymethyl acrylate, ethoxyethyl acrylate, perfluorooctyl acrylate, stearyl acrylate or a combination thereof. In some embodiments, the ester group-containing monomer is cyclohexyl acrylate, cyclohexyl methacrylate, isobornyl acrylate, isobornyl methacrylate, 3,3,5-trimethylcyclohexylacrylate, or a combination thereof. In some embodiments, the ester group-containing monomer is methyl methacrylate, ethyl methacrylate, n-propyl methacrylate, isopropyl methacrylate, n-butyl methacrylate, sec-butyl methacrylate, tert-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, 2,2,2-trifluoroethyl methacrylate, phenyl methacrylate, benzyl methacrylate, or a combination thereof.

In some embodiments, the binder composition is free of a structural unit derived from a conjugated diene group-containing monomer. Examples of conjugated diene group-containing monomer include aliphatic conjugated diene monomers such as 1,3-butadiene, 2-methyl-1,3-butadiene, 2,3-dimethyl-1,3-butadiene, 2-chloro-1,3-butadiene, substituted linear conjugated pentadienes, and substituted branched conjugated hexadienes.

In some embodiments, the binder composition is free of a structural unit derived from an aromatic vinyl group-containing monomer. Examples of aromatic vinyl group-containing monomer include styrene, α-methylstyrene, vinyltoluene, and divinylbenzene.

In some embodiments, the pH of the binder composition is from about 7 to about 10, from about 7.2 to about 10, from about 7.4 to about 10, from about 7.5 to about 10, from about 7.6 to about 10, from about 7.8 to about 10, from about 8 to about 10, from about 8.2 to about 10, from about 8.4 to about 10, from about 8.5 to about 10, from about 7 to about 9.5, from about 7.2 to about 9.5, from about 7.4 to about 9.5, from about 7.5 to about 9.5, from about 7.6 to about 9.5, from about 7.8 to about 9.5, from about 8 to about 9.5, from about 7 to about 9, from about 7.2 to about 9, from about 7.4 to about 9, from about 7.5 to about 9, from about 7.6 to about 9, from about 7.8 to about 9, from about 8 to about 9, from about 7 to about 8.5, from about 7.2 to about 8.5, from about 7.4 to about 8.5, or from about 7.5 to about 8.5.

In certain embodiments, the pH of the binder composition is less than 10, less than 9.8, less than 9.5, less than 9.2, less than 9, less than 8.8, less than 8.6, less than 8.5, less than 8.4, less than 8.2, less than 8, less than 7.9, less than 7.8, less than 7.7, less than 7.6, less than 7.5, less than 7.4, or less than 7.2. In certain embodiments, the pH of the binder composition is more than 7, more than 7.2, more than 7.4, more than 7.5, more than 7.6, more than 7.7, more than 7.8, more than 7.9, more than 8, more than 8.2, more than 8.4, more than 8.5, more than 8.6, more than 8.8, more than 9, more than 9.2, more than 9.5, or more than 9.8.

In some embodiments, the viscosity of the binder composition is from about 5,000 mPa·s to about 25,000 mPa·s, from about 6,000 mPa·s to about 25,000 mPa·s, from about 8,000 mPa·s to about 25,000 mPa·s, from about 10,000 mPa·s to about 25,000 mPa·s, from about 12,000 mPa·s to about 25,000 mPa·s, from about 14,000 mPa·s to about 25,000 mPa·s, from about 15,000 mPa·s to about 25,000 mPa·s, from about 16,000 mPa·s to about 25,000 mPa·s, from about 18,000 mPa·s to about 25,000 mPa·s, from about 20,000 mPa·s to about 25,000 mPa·s, from about 5,000 mPa·s to about 22,000 mPa·s, from about 6,000 mPa·s to about 22,000 mPa·s, from about 8,000 mPa·s to about 22,000 mPa·s, from about 10,000 mPa·s to about 22,000 mPa·s, from about 12,000 mPa·s to about 22,000 mPa·s, from about 14,000 mPa·s to about 22,000 mPa·s, from about 15,000 mPa·s to about 22,000 mPa·s, from about 5,000 mPa·s to about 20,000 mPa·s, from about 6,000 mPa·s to about 20,000 mPa·s, from about 8,000 mPa·s to about 20,000 mPa·s, from about 10,000 mPa·s to about 20,000 mPa·s, from about 12,000 mPa·s to about 20,000 mPa·s, from about 5,000 mPa·s to about 18,000 mPa·s, from about 6,000 mPa·s to about 18,000 mPa·s, from about 8,000 mPa·s to about 18,000 mPa·s, from about 10,000 mPa·s to about 18,000 mPa·s, from about 5,000 mPa·s to about 15,000 mPa·s, from about 6,000 mPa·s to about 15,000 mPa·s, or from about 8,000 mPa·s to about 15,000 mPa·s. When the viscosity of the binder composition is within the ranges set forth above, the processibility of the binder composition is optimized.

In some embodiments, the viscosity of the binder composition is less than 25,000 mPa·s, less than 24,000 mPa·s, less than 23,000 mPa·s, less than 22,000 mPa·s, less than 21,000 mPa·s, less than 20,000 mPa·s, less than 19,000 mPa·s, less than 18,000 mPa·s, less than 17,000 mPa·s, less than 16,000 mPa·s, less than 15,000 mPa·s, less than 14,000 mPa·s, less than 13,000 mPa·s, less than 12,000 mPa·s, less than 11,000 mPa·s, less than 10,000 mPa·s, less than 9,000 mPa·s, less than 8,000 mPa·s, or less than 7,000 mPa·s. In some embodiments, the viscosity of the binder composition is more than 5,000 mPa·s, more than 6,000 mPa·s, more than 7,000 mPa·s, more than 8,000 mPa·s, more than 9,000 mPa·s, more than 10,000 mPa·s, more than 11,000 mPa·s, more than 12,000 mPa·s, more than 13,000 mPa·s, more than 14,000 mPa·s, more than 15,000 mPa·s, more than 16,000 mPa·s, more than 17,000 mPa·s, more than 18,000 mPa·s, more than 19,000 mPa·s, more than 20,000 mPa·s, more than 21,000 mPa·s, more than 22,000 mPa·s, or more than 23,000 mPa·s.

In some embodiments, the solid content of the binder composition is from about 1% to about 20%, from about 3% to about 20%, from about 5% to about 20%, from about 6% to about 20%, from about 7% to about 20%, from about 7.5% to about 20%, from about 8% to about 20%, from about 8.5% to about 20%, from about 9% to about 20%, from about 9.5% to about 20%, from about 10% to about 20%, from about 1% to about 15%, from about 3% to about 15%, from about 5% to about 15%, from about 6% to about 15%, from about 7% to about 15%, from about 7.5% to about 15%, from about 8% to about 15%, from about 8.5% to about 15%, from about 9% to about 15%, from about 10% to about 15%, from about 1% to about 13%, from about 3% to about 13%, from about 5% to about 13%, from about 7% to about 13%, from about 7.5% to about 13%, from about 8% to about 13%, from about 1% to about 10%, from about 3% to about 10%, or from about 5% to about 10% by weight, based on the total weight of the binder composition.

In some embodiments, the solid content of the binder composition is less than 20%, less than 18%, less than 16%, less than 14%, less than 13%, less than 12%, less than 11%, less than 10%, less than 9.5%, less than 9%, less than 8.5%, less than 8%, less than 7.5%, less than 7%, less than 6%, less than 5%, or less than 3% by weight, based on the total weight of the binder composition. In some embodiments, the solid content of the binder composition is more than 1%, more than 3%, more than 5%, more than 6%, more than 7%, more than 7.5%, more than 8%, more than 8.5%, more than 9%, more than 9.5%, more than 10%, more than 11%, more than 12%, more than 13%, more than 14%, more than 16%, or more than 18% by weight, based on the total weight of the binder composition.

In some embodiments, the weight average-molecular weight of the binder composition is from about 100,000 g/mol to about 200,000 g/mol, from about 110,000 g/mol to about 200,000 g/mol, from about 120,000 g/mol to about 200,000 g/mol, from about 130,000 g/mol to about 200,000 g/mol, from about 140,000 g/mol to about 200,000 g/mol, from about 150,000 g/mol to about 200,000 g/mol, from about 160,000 g/mol to about 200,000 g/mol, from about 170,000 g/mol to about 200,000 g/mol, from about 100,000 g/mol to about 180,000 g/mol, from about 110,000 g/mol to about 180,000 g/mol, from about 120,000 g/mol to about 180,000 g/mol, from about 130,000 g/mol to about 180,000 g/mol, from about 140,000 g/mol to about 180,000 g/mol, from about 150,000 g/mol to about 180,000 g/mol, from about 100,000 g/mol to about 150,000 g/mol, from about 110,000 g/mol to about 150,000 g/mol, or from about 120,000 g/mol to about 150,000 g/mol. When the weight-average molecular weight of the binder composition is within the ranges set forth above, the adhesive strength of the binder composition is improved.

In some embodiments, the weight-average molecular weight of the binder composition is less than 200,000 g/mol, less than 195,000 g/mol, less than 190,000 g/mol, less than 185,000 g/mol, less than 180,000 g/mol, less than 175,000 g/mol, less than 170,000 g/mol, less than 165,000 g/mol, less than 160,000 g/mol, less than 155,000 g/mol, less than 150,000 g/mol, less than 145,000 g/mol, less than 140,000 g/mol, less than 135,000 g/mol, less than 130,000 g/mol, less than 125,000 g/mol, less than 120,000 g/mol, less than 115,000 g/mol, or less than 110,000 g/mol. In some embodiments, the weight-average molecular weight of the binder composition is more than 100,000 g/mol, more than 105,000 g/mol, more than 110,000 g/mol, more than 115,000 g/mol, more than 120,000 g/mol, more than 125,000 g/mol, more than 130,000 g/mol, more than 135,000 g/mol, more than 140,000 g/mol, more than 145,000 g/mol, more than 150,000 g/mol, more than 155,000 g/mol, more than 160,000 g/mol, more than 165,000 g/mol, more than 170,000 g/mol, more than 175,000 g/mol, more than 180,000 g/mol, more than 185,000 g/mol, or more than 190,000 g/mol.

In some embodiments, the number-average molecular weight of the binder composition is from about 30,000 g/mol to about 100,000 g/mol, from about 35,000 g/mol to about 100,000 g/mol, from about 40,000 g/mol to about 100,000 g/mol, from about 45,000 g/mol to about 100,000 g/mol, from about 50,000 g/mol to about 100,000 g/mol, from about 55,000 g/mol to about 100,000 g/mol, from about 60,000 g/mol to about 100,000 g/mol, from about 65,000 g/mol to about 100,000 g/mol, from about 70,000 g/mol to about 100,000 g/mol, from about 75,000 g/mol to about 100,000 g/mol, from about 40,000 g/mol to about 85,000 g/mol, from about 45,000 g/mol to about 85,000 g/mol, from about 50,000 g/mol to about 85,000 g/mol, from about 55,000 g/mol to about 85,000 g/mol, from about 60,000 g/mol to about 85,000 g/mol, from about 65,000 g/mol to about 85,000 g/mol, from about 70,000 g/mol to about 85,000 g/mol, from about 40,000 g/mol to about 75,000 g/mol, from about 45,000 g/mol to about 75,000 g/mol, from about 50,000 g/mol to about 75,000 g/mol, from about 55,000 g/mol to about 75,000 g/mol, or from about 60,000 g/mol to about 75,000 g/mol. When the number-average molecular weight of the binder composition is within the ranges set forth above, the adhesive strength of the binder composition is improved.

In some embodiments, the number-average molecular weight of the binder composition is less than 100,000 g/mol, less than 95,000 g/mol, less than 90,000 g/mol, less than 85,000 g/mol, less than 80,000 g/mol, less than 75,000 g/mol, less than 70,000 g/mol, less than 65,000 g/mol, less than 60,000 g/mol, less than 55,000 g/mol, less than 50,000 g/mol, less than 45,000 g/mol, less than 40,000 g/mol, or less than 35,000 g/mol. In some embodiments, the number-average molecular weight of the binder composition is more than 30,000 g/mol, more than 35,000 g/mol, more than 40,000 g/mol, more than 45,000 g/mol, more than 50,000 g/mol, more than 55,000 g/mol, more than 60,000 g/mol, more than 65,000 g/mol, more than 70,000 g/mol, more than 75,000 g/mol, more than 80,000 g/mol, more than 85,000 g/mol, more than 90,000 g/mol, or more than 95,000 g/mol.

In some embodiments, the polydispersity index (PDI) of the binder composition is from about 1 to about 5, from about 1 to about 4.8, from about 1 to about 4.6, from about 1 to about 4.5, from about 1 to about 4.4, from about 1 to about 4.2, from about 1 to about 4, from about 1 to about 3.8, from about 1 to about 3.6, from about 1 to about 3.5, from about 1 to about 3.4, from about 1 to about 3.2, from about 1 to about 3, from about 1.3 to about 5, from about 1.3 to about 4.8, from about 1.3 to about 4.6, from about 1.3 to about 4.5, from about 1.3 to about 4.4, from about 1.3 to about 4.2, from about 1.3 to about 4, from about 1.3 to about 3.8, from about 1.3 to about 3.6, from about 1.3 to about 3.5, from about 1.3 to about 3.4, from about 1.3 to about 3.2, from about 1.3 to about 3, from about 1.5 to about 5, from about 1.5 to about 4.8, from about 1.5 to about 4.6, from about 1.5 to about 4.5, from about 1.5 to about 4.4, from about 1.5 to about 4.2, from about 1.5 to about 4, from about 1.5 to about 3.8, from about 1.5 to about 3.6, from about 1.5 to about 3.5, from about 1.5 to about 3.4, from about 1.5 to about 3.2, from about 1.5 to about 3, from about 1.8 to about 5, from about 1.8 to about 4.8, from about 1.8 to about 4.6, from about 1.8 to about 4.5, from about 1.8 to about 4.4, from about 1.8 to about 4.2, from about 1.8 to about 4, from about 2 to about 5, from about 2 to about 4.8, from about 2 to about 4.6, from about 2 to about 4.5, from about 2 to about 4.4, from about 2 to about 4.2, or from about 2 to about 4. Stability of the binder composition can be further improved when the polydispersity index of the binder composition is within the range set forth above.

In some embodiments, the polydispersity index of the binder composition is less than 5, less than 4.8, less than 4.6, less than 4.5, less than 4.4, less than 4.2, less than 4, less than 3.8, less than 3.6, less than 3.5, less than 3.4, less than 3.2, less than 3, less than 2.8, less than 2.6, less than 2.5, less than 2.4, less than 2.2, less than 2, less than 1.8, less than 1.6, less than 1.5, less than 1.4, or less than 1.2. In some embodiments, the polydispersity index of the binder composition is more than 1, more than 1.2, more than 1.4, more than 1.5, more than 1.6, more than 1.8, more than 2, more than 2.2, more than 2.4, more than 2.5, more than 2.6, more than 2.8, more than 3, more than 3.2, more than 3.4, more than 3.5, more than 3.6, more than 3.8, more than 4, more than 4.2, more than 4.4, more than 4.5, more than 4.6, or more than 4.8.

The binder composition of the present invention exhibits strong adhesion to the current collector. It is important for the binder composition to have good adhesive strength to the current collector as it promotes the binding force of the electrode layer to the current collector in the making of battery electrode, prevents separation and enhances the mechanical stability of the electrode. In some embodiments, the adhesive strength between the binder composition and the current collector is from about 1 N/cm to about 10 N/cm, from about 1.5 N/cm to about 10 N/cm, from about 2 N/cm to about 10 N/cm, from about 2.5 N/cm to about 10 N/cm, from about 3 N/cm to about 10 N/cm, from about 3.5 N/cm to about 10 N/cm, from about 4 N/cm to about 10 N/cm, from about 4.5 N/cm to about 10 N/cm, from about 5 N/cm to about 10 N/cm, from about 5.5 N/cm to about 10 N/cm, from about 6 N/cm to about 10 N/cm, from about 6.5 N/cm to about 10 N/cm, from about 7 N/cm to about 10 N/cm, from about 7.5 N/cm to about 10 N/cm, from about 1 N/cm to about 8 N/cm, from about 1.5 N/cm to about 8 N/cm, from about 2 N/cm to about 8 N/cm, from about 2.5 N/cm to about 8 N/cm, from about 3 N/cm to about 8 N/cm, from about 3.5 N/cm to about 8 N/cm, from about 4 N/cm to about 8 N/cm, from about 4.5 N/cm to about 8 N/cm, from about 5 N/cm to about 8 N/cm, from about 5.5 N/cm to about 8 N/cm, from about 6 N/cm to about 8 N/cm, from about 2 N/cm to about 6.5 N/cm, from about 2.5 N/cm to about 6.5 N/cm, from about 3 N/cm to about 6.5 N/cm, from about 3.5 N/cm to about 6.5 N/cm, from about 4 N/cm to about 6.5 N/cm, from about 4.5 N/cm to about 6.5 N/cm, from about 5 N/cm to about 6.5 N/cm, from about 2 N/cm to about 5 N/cm, from about 2.5 N/cm to about 5 N/cm, from about 3 N/cm to about 5 N/cm, from about 3.5 N/cm to about 5 N/cm, from about 2 N/cm to about 4 N/cm, from about 2.5 N/cm to about 4 N/cm, or from about 3 N/cm to about 4 N/cm.

In some embodiments, the adhesive strength between the binder composition and the current collector is less than 10 N/cm, less than 9.5 N/cm, less than 9 N/cm, less than 8.5 N/cm, less than 8 N/cm, less than 7.5 N/cm, less than 7 N/cm, less than 6.5 N/cm, less than 6 N/cm, less than 5.5 N/cm, less than 5 N/cm, less than 4.5 N/cm, less than 4 N/cm, less than 3.5 N/cm, less than 3 N/cm, less than 2.5 N/cm, less than 2 N/cm, or less than 1.5 N/cm. In some embodiments, the adhesive strength between the binder composition and the current collector is more than 1 N/cm, more than 1.5 N/cm, more than 2 N/cm, more than 2.5 N/cm, more than 3 N/cm, more than 3.5 N/cm, more than 4 N/cm, more than 4.5 N/cm, more than 5 N/cm, more than 5.5 N/cm, more than 6 N/cm, more than 6.5 N/cm, more than 7 N/cm, more than 7.5 N/cm, more than 8 N/cm, more than 8.5 N/cm, more than 9 N/cm, or more than 9.5 N/cm.

In another aspect, provided herein is an electrode for a secondary battery, comprising an electrode active material, a current collector and the binder composition prepared by the method described above. In certain embodiments, the electrode further comprises a conductive agent.

In some embodiments, the electrode active material is a cathode active material, wherein the cathode active material is selected from the group consisting of $LiCoO_2$, $LiNiO_2$, $LiNi_xMn_yO_2$, $Li_{1+z}Ni_xMn_yCo_{1-x-y}O_2$. $LiNi_xCo_yAl_zO_2$, $LiV_2O_5$, $LiTiS_2$, $LiMOS_2$, $LiMnO_2$, $LiClO_2$. $LiMn_2O_4$, $Li_2MnO_3$, $LiFeO_2$, $LiFePO_4$, and combinations thereof, wherein each x is independently from 0.2 to 0.9; each y is independently from 0.1 to 0.45; and each z is independently from 0 to 0.2. In certain embodiments, the cathode active material is selected from the group consisting of $LiCoO_2$, $LiNiO_2$, $LiNi_x Mn_yO_2$, $Li_{1+z}Ni_xMn_yCo_{1-x-y}O_2$ (NMC), $LiNi_xCo_yAl_2O_2$, $LiV_2O_5$, $LiTiS_2$, $LiMOS_2$, $LiMnO_2$, $LiCrO_2$, $LiMn_2O_4$, $LiFeO_2$, $LiFePO_4$, and combinations thereof, wherein each x is independently from 0.4 to 0.6; each y is independently from 0.2 to 0.4; and each z is independently from 0 to 0.1. In other embodiments, the cathode active material is not $LiCoO_2$, $LiNiO_2$, $LiV_2O_5$, $LiTiS_2$, $LiMOS_2$, $LiMnO_2$, $LiCrO_2$, $LiMn_2O_4$, $LiFeO_2$, or $LiFePO_4$. In further embodiments, the cathode active material is not $LiNi_x Mn_yO_2$, $Li_{1+z}Ni_xMn_yCo_{1-x-y}O_2$, or $LiNi_xCo_yAl_zO_2$, wherein each x is independently from 0.2 to 0.9; each y is independently from 0.1 to 0.45; and each z is independently from 0 to 0.2. In certain embodiments, the cathode active material is $Li_{1+x}Ni_aMn_bCo_cAl_{(1-a-b-c)}O_2$; wherein $-0.2 \leq x \leq 0.2$, $0 \leq a < 1$, $0 \leq b < 1$, $0 \leq c < 1$, and $a+b+c \leq 1$. In some embodiments, the cathode active material has the general formula $Li_{1+x}Ni_aMn_bCo_cAl_{(1-a-b-c)}O_2$, with $0.33 \leq a \leq 0.92$, $0.33 \leq a \leq 0.9$, $0.33 \leq a \leq 0.8$, $0.5 \leq a \leq 0.92$, $0.5 \leq a \leq 0.9$, $0.5 \leq a \leq 0.8$, $0.6 \leq a \leq 0.92$, or $0.6 \leq a \leq 0.9$; $0 \leq b \leq 0.5$, $0 \leq b \leq 0.3$, $0.1 < b \leq 0.5$, $0.1 \leq b \leq 0.4$, $0.1 < b \leq 0.3$, $0.1 < b \leq 0.2$, or $0.2 \leq b \leq 0.5$; $0 \leq c < 0.5$, $0 \leq c < 0.3$, $0.1 \leq c < 0.5$, $0.1 < c < 0.4$, $0.1 \leq c \leq 0.3.0.1 \leq c \leq 0.2$, or $0.2 \leq c \leq 0.5$.

In certain embodiments, the cathode active material is doped with a dopant selected from the group consisting of Fe, Ni, Mn, Al, Mg, Zn, Ti, La, Cc, Sn, Zr, Ru, Si, Ge, and combinations thereof. In some embodiments, the dopant is not Fe, Ni, Mn, Mg, Zn, Ti, La, Ce, Ru, Si, or Ge. In certain embodiments, the dopant is not Al, Sn, or Zr.

In some embodiments, the cathode active material is $LiNi_{0.33}Mn_{0.33}Co_{0.33}O_2$ (NMC333), $LiNi_{0.4}Mn_{0.4}Co_{0.2}O_2$, $LiNi_{0.5}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.8}Mn_{0.1}Co_{0.1}O_2$ (NMC811), $LiNi_{0.92}Mn_{0.04}Co_{0.04}O_2$, $LiNi_{0.8}Co_{0.15}Al_{0.05}O_2$ (NCA), $LiNiO_2$ (LNO), and combinations thereof.

In other embodiments, the cathode active material is not $LiCoO_2$, $LiNiO_2$, $LiMnO_2$, $LiMn_2O_4$, or $Li_2MnO_3$. In further embodiments, the cathode active material is not $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_aTi_5O_{12}$. $LiV_2O_5$, $LiTiS_2$, $LiMOS_2$, and combinations thereof; wherein $-0.2 \leq x < 0.2$, $0 < a < 1$, $0 \leq b < 1$, $0 \leq c < 1$, and $a+b+c \leq 1$. In other embodiments, the core and the shell each independently comprise two or more lithium transition metal oxides. In some embodiments, one of the core or shell comprises only one lithium transition metal oxide, while the other comprises two or more lithium transition metal oxides. The lithium transition metal oxides in the core and the shell may be the same, or they may be different or partially different. In some embodiments, the two or more lithium transition metal oxides are uniformly distributed over the core. In certain embodiments, the two or more lithium transition metal oxides are not uniformly distributed over the core. In some embodiments, the cathode active material is not a core-shell composite.

In some embodiments, each of the lithium transition metal oxides in the core and the shell is independently doped with a dopant selected from the group consisting of Fe, Ni, Mn, Al, Mg, Zn, Ti, La, Ce, Sn, Zr, Ru, Si, Ge, and combinations thereof. In certain embodiments, the core and the shell each independently comprise two or more doped lithium transition metal oxides. In some embodiments, the two or more doped lithium transition metal oxides are uniformly distributed over the core and/or the shell. In certain embodiments, the two or more doped lithium transition metal oxides are not uniformly distributed over the core and/or the shell.

In some embodiments, the cathode active material comprises or is a core-shell composite comprising a core comprising a lithium transition metal oxide and a shell comprising a transition metal oxide. In certain embodiments, the lithium transition metal oxide is selected from the group consisting of $Li_{1+x}Ni_aMn_bCo_cAl_{(l-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMOS_2$, and combinations thereof; wherein—$0.2 \leq x \leq 0.2$, $0 \leq a < 1$, $0 \leq b < 1$, $0 \leq c < 1$, and $a+b+c \leq 1$. In some embodiments, the transition metal oxide is selected from the group consisting of $Fe_2O_3$, $MnO_2$, $Al_2O_3$, MgO, ZnO, $TiO_2$, $La_2O_3$, $CeO_2$, $SnO_2$, $ZrO_2$, $RuO_2$, and combinations thereof. In certain embodiments, the shell comprises a lithium transition metal oxide and a transition metal oxide.

In some embodiments, the diameter of the core is from about 1 μm to about 15 μm, from about 3 μm to about 15 μm, from about 3 μm to about 10 μm, from about 5 μm to about 10 μm, from about 5 μm to about 45 μm, from about 5 μm to about 35 μm, from about 5 μm to about 25 μm, from about 10 μm to about 45 μm, from about 10 μm to about 40 μm, or from about 10 μm to about 35 μm, from about 10 μm to about 25 μm, from about 15 μm to about 45 μm, from about 15 μm to about 30 μm, from about 15 μm to about 25 μm, from about 20 μm to about 35 μm, or from about 20 μm to about 30 μm. In certain embodiments, the thickness of the shell is from about 1 μm to about 45 μm, from about 1 μm to about 35 μm, from about 1 μm to about 25 μm, from about 1 μm to about 15 μm, from about 1 μm to about 10 μm, from about 1 μm to about 5 μm, from about 3 μm to about 15 μm, from about 3 μm to about 10 μm, from about 5 μm to about 10 μm, from about 10 μm to about 35 μm, from about 10 μm to about 20 μm, from about 15 μm to about 30 μm, from about 15 μm to about 25 μm, or from about 20 μm to about 35 μm. In certain embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 95:5, 90:10, 80:20, 70:30, 60:40, 50:50, 40:60, or 30:70.

The current collector collects electrons generated by electrochemical reactions of the cathode active material or supplies electrons required for the electrochemical reactions. In some embodiments, the current collector can be in the form of a foil, sheet or film. In certain embodiments, the current collector is stainless steel, titanium, nickel, aluminum, copper, or alloys thereof or electrically-conductive resin. In certain embodiments, the current collector has a two-layered structure comprising an outer layer and an inner layer, wherein the outer layer comprises a conductive material and the inner layer comprises an insulating material or another conductive material; for example, aluminum mounted with a conductive resin layer or a polymeric insulating material coated with an aluminum film. In some embodiments, the current collector has a three-layered structure comprising an outer layer, a middle layer and an inner layer, wherein the outer and inner layers comprise a conductive material and the middle layer comprises an insulating material or another conductive material; for example, a plastic substrate coated with a metal film on both sides. In certain embodiments, each of the outer layer, middle layer and inner layer is independently stainless steel, titanium, nickel, aluminum, copper, or alloys thereof or electrically-conductive resin. In some embodiments, the insulating material is a polymeric material selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly (vinyl ester), polyvinyl chloride, polyether, polyphenylene oxide, cellulose polymer and combinations thereof. In certain embodiments, the current collector has more than three layers. In some embodiments, the current collector is coated with a protective coating. In certain embodiments, the protective coating comprises a carbon-containing material. In some embodiments, the current collector is not coated with a protective coating.

The thickness of the current collector affects the volume it occupies within the battery, and hence the energy density of the battery. In some embodiments, the current collector has a thickness from about 5 μm to about 30 μm. In certain embodiments, the current collector has a thickness from about 5 μm to about 20 μm, from about 5 μm to about 15 μm, from about 10 μm to about 30 μm, from about 10 μm to about 25 μm, or from about 10 μm to about 20 μm.

In some embodiments, the current collector has a thickness of less than 30 μm, less than 28 μm, less than 26 μm, less than 24 μm, less than 22 μm, less than 20 μm, less than 18 μm, less than 16 μm, less than 14 μm, less than 12 μm, less than 10 μm, less than 8 μm or less than 6 μm. In some embodiments, the current collector has a thickness of more than 5 μm, more than 7 μm, more than 10 μm, more than 12 μm, more than 14 μm, more than 16 μm, more than 18 μm, more than 20 μm, more than 22 μm, more than 24 μm, more than 26 μm or more than 28 μm.

The conductive agent is for enhancing the electrical conductive properties of an electrode. Any suitable material can act as the conductive agent. In some embodiments, the conductive agent is a carbonaceous material. Some non-limiting examples include carbon, carbon black, graphite, expanded graphite, graphene, graphene nanoplatelets, carbon fibers, carbon nano-fibers, graphitized carbon flake, carbon tubes, activated carbon, Super P. KS6, vapor grown carbon fibers (VGCF), mesoporous carbon and combinations thereof.

In addition, the cathode prepared using the binder composition in the present invention exhibits strong adhesion of the electrode layer to the current collector. It is important for the electrode layer to have good peeling strength to the current collector as this prevents delamination or separation of the electrode, which would greatly influence the mechanical stability of the electrodes and the cyclability of the battery. Therefore, the electrodes should have sufficient peeling strength to withstand the rigors of battery manufacture.

In some embodiments, the peeling strength between the current collector and the electrode layer is in the range from about 1.0 N/cm to about 8.0 N/cm, from about 1.0 N/cm to about 6.0 N/cm, from about 1.0 N/cm to about 5.0 N/cm, from about 1.0 N/cm to about 4.0 N/cm, from about 1.0 N/cm to about 3.0 N/cm, from about 1.0 N/cm to about 2.5 N/cm, from about 1.0 N/cm to about 2.0 N/cm, from about 1.2 N/cm to about 3.0 N/cm, from about 1.2 N/cm to about 2.5 N/cm, from about 1.2 N/cm to about 2.0 N/cm, from about 1.5 N/cm to about 3.0 N/cm, from about 1.5 N/cm to about 2.5 N/cm, from about 1.5 N/cm to about 2.0 N/cm, from about 1.8 N/cm to about 3.0 N/cm, from about 1.8 N/cm to about 2.5 N/cm, from about 2.0 N/cm to about 6.0 N/cm, from about 2.0 N/cm to about 5.0 N/cm, from about 2.0 N/cm to about 3.0 N/cm, from about 2.0 N/cm to about 2.5 N/cm, from about 2.2 N/cm to about 3.0 N/cm, from about 2.5 N/cm to about 3.0 N/cm, from about 3.0 N/cm to about 8.0 N/cm, from about 3.0 N/cm to about 6.0 N/cm, or from about 4.0 N/cm to about 6.0 N/cm.

In some embodiments, the peeling strength between the current collector and the electrode layer is 1.0 N/cm or more, 1.2 N/cm or more, 1.5 N/cm or more, 2.0 N/cm or more, 2.2 N/cm or more, 2.5 N/cm or more, 3.0 N/cm or more, 3.5 N/cm or more, 4.5 N/cm or more, 5.0 N/cm or more, or 5.5 N/cm or more. In some embodiments, the peeling strength between the current collector and the electrode layer is less than 6.5 N/cm, less than 6.0 N/cm, less than 5.5 N/cm, less than 5.0 N/cm, less than 4.5 N/cm, less than 4.0 N/cm, less than 3.5 N/cm, less than 3.0 N/cm, less than 2.8 N/cm, less than 2.5 N/cm, less than 2.2 N/cm, less than 2.0 N/cm, less than 1.8 N/cm, or less than 1.5 N/cm.

When the binder composition comes into contact with an electrolyte, it may take up some of the electrolyte and swell up. The extent of swelling of the binder composition from an uptake of electrolyte provides insight into the crystallinity of the binder composition, how the binder composition interacts with the electrolyte and the flexibility of the binder composition. On one hand, a binder composition of high crystallinity exhibits low swelling behavior that can act as barriers for electrolyte solvent ingress. This allows shorter ion transport pathways, thus reducing internal resistance and, more importantly, altering the mechanical properties of the swollen polymer, which are critical to stable battery performance. On the other hand, a binder composition of low crystallinity has a higher number of amorphous regions, where higher amounts of electrolyte can penetrate into the binder composition to ensure good ion transport without the binder composition breaking apart when subjected to expansion. A semi-crystalline binder composition disclosed herein benefits from both influence factors and therefore demonstrates exceptional electrochemical performance.

In some embodiments, the electrolyte swelling of the binder composition is from about 1% to about 15%, from about 2% to about 15%, from about 3% to about 15%, from about 4% to about 15%, from about 5% to about 15%, from about 6% to about 15%, from about 7% to about 15%, from about 7.5% to about 15%, from about 8% to about 15%, from about 8.5% to about 15%, from about 9% to about 15%, from about 9.5% to about 15%, from about 10% to about 15%, from about 3% to about 10%, from about 4% to about 10%, from about 5% to about 10%, from about 6% to about 10%, from about 7% to about 10%, from about 5% to about 9%, from about 6% to about 9%, from about 7% to about 9%, from about 7.5% to about 9%, or from about 8% to about 9% by weight.

In some embodiments, the electrolyte swelling of the binder composition is less than 15%, less than 14%, less than 13%, less than 12%, less than 11%, less than 10%, less than 9.5%, less than 9%, less than 8.5%, less than 8%, less than 7.5%, less than 7%, less than 6%, less than 5%, less than 4%, less than 3%, or less than 2% by weight. In some embodiments, the electrolyte swelling of the binder composition is more than 1%, more than 2%, more than 3%, more than 4%, more than 5%, more than 6%, more than 7%, more than 7.5%, more than 8%, more than 8.5%, more than 9%, more than 9.5%, more than 10%, more than 11%, more than 12%, more than 13%, or more than 14% by weight.

The binder composition disclosed herein has the advantage that aqueous solvents can be used in its manufacturing process, which can save on processing time and equipment, as well as improve safety by eliminating the need to handle or recycle hazardous organic solvents. In addition, costs are reduced as the overall process is simplified. Therefore, this binder composition is especially suited for large-scale manufacturing because of the low cost and case of handling of its manufacturing method.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The pH values of the binder composition were measured by an electrode-type pH meter (ION 2700, Eutech Instruments).

The viscosities of the binder composition were measured at 25° C. with a rotational viscosity meter (NDJ-5S, Shanghai JT Electronic Technology Co. Ltd., China) using rotor type no. 3 at a speed of 30 rpm.

The adhesive strengths of the dried binder composition layers were measured by a tensile testing machine (DZ-106A, obtained from Dongguan Zonhow Test Equipment Co. Ltd., China). This test measures the average force required to peel a binder composition layer from the current collector at 180° angle in newtons. The mean roughness depth ($R_z$) of the current collector was 2 μm. The binder composition was coated on the current collector and dried to obtain a binder composition layer of thickness 10 μm to 12 μm. The coated current collector was then placed in an environment of constant temperature of 25° C. and relative humidity of 50% to 60% for 30 minutes. A strip of adhesion tape (3M; US; model no. 810) with a width of 18 mm and a length of 20 mm was attached onto the surface of the binder composition layer. The binder composition strip was clipped onto the testing machine, and the tape was folded back on itself at 180 degrees, placed in a moveable jaw and pulled at room temperature and a peel rate of 300 mm per minute. The maximum stripping force measured was taken as the adhesive strength. Measurements were repeated three times to find the average value.

The solid content of the binder composition measures the extent of mass change of binder composition before and after drying. Approximately 1 g of a binder composition was weighed in a weighing bottle and dried at 110±5° C. and −0.09 MPa for more than 5 hours by a vacuum dryer. The binder composition was cooled in a desiccator for about 15 minutes and then its mass was measured. The difference in mass of the binder composition before and after the drying was determined, and the solid content (%) of the binder composition was calculated according to the following formula:

$$\text{Solid content} = \frac{\text{Mass of binder composition after drying}}{\text{Mass of binder composition before drying}} \times 100\%$$

The weight-average molecular weight and number-average molecular weight of the binder composition were measured by gel permeation chromatography (GPC). The binder composition was first dissolved in dimethylformamide at room temperature. Once dissolution of the binder composition was complete, the solution was gently filtered through a 0.45 μm filter to prepare a measurement sample. A polystyrene standard was used to prepare a calibration curve against which the weight-average molecular weight and the number-average molecular weight of the binder composition were calculated. The obtained measurement sample was analyzed with an Agilent PLgel 5 μm MIXED-C column. The flow rate was 1 ml/min and the weight of the sample was 2 mg. The detector used was Waters 2414 Refractive Index (RI) Detector and the detection temperature was 35° C.

Example 1

A) Preparation of Binder Composition 11.90 g of sodium hydroxide (NaOH) was added into a round-bottom flask containing 380 g of distilled water. The mixture was stirred at 80 rpm for 30 mins to obtain a first suspension.

24.78 g of acrylic acid was added into the first suspension. The mixture was further stirred at 80 rpm for 30 mins to obtain a second suspension.

7.19 g of acrylamide was dissolved in 10 g of DI water to form an acrylamide solution. Thereafter, all of the acrylamide solution was added into the second suspension. The mixture was further heated to 55° C. and stirred at 80 rpm for 45 mins to obtain a third suspension.

30.06 g of acrylonitrile was added into the third suspension. The mixture was further stirred at 80 rpm for 10 mins to obtain a fourth suspension.

Further, 0.03 g of water-soluble free radical initiator (ammonium persulfate, APS; obtained from Aladdin Industries Corporation, China) was dissolved in 3 g of DI water and 0.015 g of reducing agent (sodium bisulfite; obtained from Tianjin Damao Chemical Reagent Factory, China) was dissolved in 1.5 g of DI water. All of the APS solution and the sodium bisulfite solution were added into the fourth suspension. The mixture was stirred at 200 rpm for 24 h at 55° C. to obtain a fifth suspension.

After the complete reaction, the temperature of the fifth suspension was lowered to 25° C. 3.72 g of NaOH was dissolved in 400 g of DI water to form a sodium hydroxide solution. Thereafter, all of the sodium hydroxide solution was added dropwise into the fifth suspension for 1 h to adjust pH to 7.3 to form the sixth suspension. The sixth suspension was filtered using 200 μm nylon mesh to form the binder composition. The weight average molecular weight, the number average molecular weight and the polydispersity index of the binder composition were 128,500 g/mol, 57,400 g/mol and 2.24 respectively. The pH and solid content of the binder composition were 7.6 and 8.31 wt. % respectively. The components of the binder composition of Example 1 and their respective proportions are shown in Table 1 below. The viscosity and adhesive strength of the binder composition of Example 1 were measured and are shown in Table 1 below.

Two more iterations of the binder composition were prepared with the reaction conditions of the polymerization reaction changed. In the first iteration, the weight-average molecular weight, the number-average molecular weight and the polydispersity index of the binder composition were 79,500 g/mol, 36,200 g/mol and 2.20 respectively, while the viscosity was 3,000 mPa·s. In the second iteration, the weight-average molecular weight, the number-average molecular weight and the polydispersity index of the binder composition were 257,000 g/mol, 134,300 g/mol and 1.91 respectively, while the viscosity was 30,000 mPa·s. In both iterations, a viable battery could not be produced because the electrode slurry prepared with the binder composition had poor processibility.

B) Preparation of Positive Electrode

A first mixture was prepared by dispersing 12 g of conductive agent (SuperP; obtained from Timcal Ltd, Bodio, Switzerland) and 100 g of the binder composition (8.31 wt. % solid content) in 74 g of deionized water while stirring with an overhead stirrer (R20, IKA). After the addition, the first mixture was further stirred for about 30 minutes at 25° C. at a speed of 1,200 rpm.

Thereafter, a second mixture was prepared by adding 276 g of NMC811 (obtained from Shandong Tianjiao New Energy Co., Ltd, China) in the first mixture at 25° C. while stirring with an overhead stirrer. Then, the second mixture was degassed under a pressure of about 10 kPa for 1 hour. Then, the second mixture was further stirred for about 60 minutes at 25° C. at a speed of 1,200 rpm to form a homogenized cathode slurry.

The homogenized cathode slurry was coated onto both sides of an aluminum foil having a thickness of 16 μm as a current collector using a doctor blade coater with a gap width of 120 μm. The coated slurry of 80 μm on the aluminum foil was dried to form a cathode electrode layer by an electrically heated oven at 85° C. The drying time was about 120 minutes. The electrode was then pressed to decrease the thickness of a cathode electrode layer to 34 μm. The surface density of the cathode electrode layer on the current collector was 16.00 mg/cm$^2$.

C) Assembling of Coin Cell

CR2032 coin-type Li cells were assembled in an argon-filled glove box. A lithium metal foil having a thickness of 500 μm was used as the anode sheet. The cathode and anode sheets were cut into disc-form positive and negative electrodes, which were then assembled into an electrode assembly by stacking the cathode and anode electrodes alternatively and then packaged in a case made of stainless steel of the CR2032 type. The cathode and anode electrodes were kept apart by separators. The separator was a ceramic-coated microporous membrane made of nonwoven fabric (MPM, Japan), which had a thickness of about 25 μm. The electrode assembly was then dried in a box-type resistance oven under vacuum (DZF-6020, obtained from Shenzhen Kejing Star Technology Co. Ltd., China) at 105° C. for about 16 hours.

An electrolyte was then injected into the case holding the packed electrodes under a high-purity argon atmosphere with a moisture and oxygen content of less than 3 ppm respectively. The electrolyte was a solution of $LiPF_6$ (1 M) in a mixture of ethylene carbonate (EC), ethyl methyl carbonate (EMC) and dimethyl carbonate (DMC) at a volume ratio of 1:1:1. After electrolyte filling, the coin cell was vacuum sealed and then mechanically pressed using a punch tooling with a standard circular shape.

D) Electrochemical Measurements

The coin cells were analyzed in a constant current mode using a multi-channel battery tester (BTS-4008-5V10 mA, obtained from Neware Electronics Co. Ltd, China). After activation at C/20 was completed, they were charged and discharged at a rate of C/2. The charging/discharging cycling tests of the cells were performed between 3.0 and 4.3 V at a current density of C/2 at 25° C. to obtain the discharge capacity. The electrochemical performance of the coin cell of Example 1 was measured and is shown in Table 1 below.

Example 2: A binder composition was prepared in the same manner as in Example 1, except that 11.09 g of NaOH was added in the preparation of the first suspension, 23.32 g of acrylic acid was added in the preparation of the second suspension, 12.22 g of acrylamide was added in the preparation of the third suspension and 27.37 g of acrylonitrile was added in the preparation of the fourth suspension. The weight-average molecular weight, the number-average molecular weight and the polydispersity index of the binder composition were 168,100 g/mol, 72,500 g/mol and 2.32 respectively. The pH and solid content of the binder composition were 8.3 and 8.75 wt. % respectively.

Example 3: A binder composition was prepared in the same manner as in Example 1, except that 16.35 g of NaOH was added in the preparation of the first suspension, 32.80 g of acrylic acid was added in the preparation of the second suspension, 4.31 g of acrylamide was added in the preparation of the third suspension and 26.30 g of acrylonitrile was added in the preparation of the fourth suspension. The weight-average molecular weight, the number-average molecular weight and the polydispersity index of the binder composition were 127,700 g/mol, 56,500 g/mol and 2.26 respectively. The pH and solid content of the binder composition were 8.2 and 6.01 wt. % respectively.

Example 4: A binder composition was prepared in the same manner as in Example 1, except that 8.26 g of NaOH was added in the preparation of the first suspension, 18.22 g of acrylic acid was added in the preparation of the second suspension, 13.66 g of acrylamide was added in the preparation of the third suspension and 30.06 g of acrylonitrile was added in the preparation of the fourth suspension. The weight-average molecular weight, the number-average molecular weight and the polydispersity index of the binder composition were 125,000 g/mol, 55,400 g/mol and 2.26 respectively. The pH and solid content of the binder composition were 7.8 and 7.69 wt. % respectively.

Example 5: A binder composition was prepared in the same manner as in Example 1, except that 10.68 g of NaOH was added in the preparation of the first suspension, 22.60 g of acrylic acid was added in the preparation of the second suspension, 16.54 g of acrylamide was added in the preparation of the third suspension and 24.69 g of acrylonitrile was added in the preparation of the fourth suspension. The pH and solid content of the binder composition were 7.9 and 8.23 wt. % respectively.

Example 6: A binder composition was prepared in the same manner as in Example 1, except that 10.28 g of NaOH was added in the preparation of the first suspension, 21.87 g of acrylic acid was added in the preparation of the second suspension, 5.03 g of acrylamide was added in the preparation of the third suspension and 33.81 g of acrylonitrile was added in the preparation of the fourth suspension. The pH and solid content of the binder composition were 7.6 and 8.24 wt. % respectively.

Example 7: A binder composition was prepared in the same manner as in Example 1, except that 14.73 g of NaOH was added in the preparation of the first suspension, 29.88 g of acrylic acid was added in the preparation of the second suspension, 8.63 g of acrylamide was added in the preparation of the third suspension and 25.23 g of acrylonitrile was added in the preparation of the fourth suspension. The weight-average molecular weight, the number-average molecular weight and the polydispersity index of the binder composition were 107,700 g/mol, 42.400 g/mol and 2.54 respectively. The pH and solid content of the binder composition were 7.8 and 8.71 wt. % respectively.

Example 8: A binder composition was prepared in the same manner as in Example 1, except that 9.87 g of NaOH was added in the preparation of the first suspension, 21.14 g of acrylic acid was added in the preparation of the second suspension, 7.91 g of acrylamide was added in the preparation of the third suspension and 32.20 g of acrylonitrile was added in the preparation of the fourth suspension. The weight-average molecular weight, the number-average molecular weight and the polydispersity index of the binder composition were 198,100 g/mol, 96,500 g/mol and 2.05 respectively. The pH and solid content of the binder composition were 7.9 and 7.81 wt. % respectively.

Example 9: A binder composition was prepared in the same manner as in Example 1, except that 8.66 g of NaOH was added in the preparation of the first suspension, 18.95 g of acrylic acid was added in the preparation of the second suspension, 17.26 g of acrylamide was added in the preparation of the third suspension and 26.84 g of acrylonitrile was added in the preparation of the fourth suspension. The pH and solid content of the binder composition were 7.9 and 7.87 wt. % respectively.

Example 10: A binder composition was prepared in the same manner as in Example 1, except that 13.52 g of NaOH was added in the preparation of the first suspension, 27.70 g of acrylic acid was added in the preparation of the second suspension, 5.75 g of acrylamide was added in the preparation of the third suspension and 28.98 g of acrylonitrile was added in the preparation of the fourth suspension. The pH and solid content of the binder composition were 7.7 and 8.35 wt. % respectively.

Comparative Example 1: A binder composition was prepared in the same manner as in Example 1, except that 6.64 g of NaOH was added in the preparation of the first suspension, 15.31 g of acrylic acid was added in the preparation of the second suspension, 5.03 g of acrylamide was added in the preparation of the third suspension and 38.64 g of acrylonitrile was added in the preparation of the fourth suspension. The pH and solid content of the binder composition were 7.7 and 7.32 wt. % respectively.

Comparative Example 2: A binder composition was prepared in the same manner as in Example 1, except that 15.13 g of NaOH was added in the preparation of the first suspension, 30.61 g of acrylic acid was added in the preparation of the second suspension, 17.26 g of acrylamide was added in the preparation of the third suspension and 18.25 g of acrylonitrile was added in the preparation of the fourth suspension. The pH and solid content of the binder composition were 7.4 and 8.92 wt. % respectively.

Comparative Example 3: A binder composition was prepared in the same manner as in Example 1, except that 6.64 g of NaOH was added in the preparation of the first suspension, 15.31 g of acrylic acid was added in the preparation of the second suspension, 23.73 g of acrylamide was added in the preparation of the third suspension and 24.69 g of acrylonitrile was added in the preparation of the fourth suspension. The pH and solid content of the binder composition were 7.7 and 8.01 wt. % respectively.

Comparative Example 4: A binder composition was prepared in the same manner as in Example 1, except that 15.54 g of NaOH was added in the preparation of the first suspension, 31.34 g of acrylic acid was added in the preparation of the second suspension, acrylamide was not added in the preparation of the third suspension and 30.59 g of acrylonitrile was added in the preparation of the fourth suspension. The pH and solid content of the binder composition were 7.9 and 8.24 wt. % respectively.

Comparative Example 5: A binder composition was prepared in the same manner as in Example 1, except that 19.58 g of NaOH was added in the preparation of the first suspension, 38.63 g of acrylic acid was added in the preparation of the second suspension, 9.35 g of acrylamide was added in the preparation of the third suspension and 18.25 g of acrylonitrile was added in the preparation of the fourth suspension. The pH and solid content of the binder composition were 7.5 and 9.85 wt. % respectively.

Comparative Example 6: A binder composition was prepared in the same manner as in Example 1, except that 2.19 g of NaOH was added in the preparation of the first suspension, 7.29 g of acrylic acid was added in the preparation of the second suspension, 17.97 g of acrylamide was added in the preparation of the third suspension and 34.89 g of acrylonitrile was added in the preparation of the fourth suspension. The pH and solid content of the binder composition were 7.2 and 8.70 wt. % respectively.

Preparation of Positive Electrodes of Examples 2-10 and Comparative Examples 1-6

The positive electrodes of Examples 2-10 and Comparative Examples 1-6 were prepared in the same manner as in Example 1, except that the binder compositions prepared in each example were used to prepare the positive electrodes of said example respectively.

Assembling of Coin Cells of Examples 2-10 and Comparative Examples 1-6

The coin cells of Examples 2-10 and Comparative Examples 1-6 were assembled in the same manner as in Example 1, except that the positive electrodes prepared in each example were used to assemble the coin cells of said example respectively.

Electrochemical Measurements of Examples 2-10 and Comparative Examples 1-6

The electrochemical performance of the coin cells of Examples 2-10 and Comparative Examples 1-6 were measured in the same manner as in Example 1 and the test results are shown in Table 1 below.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

TABLE 1

| | Proportion of structural units in the copolymer (mol %) | | | Viscosity | Adhesive strength | 0.5 C Initial discharging capacity | Capacity retention after 50 cycles |
|---|---|---|---|---|---|---|---|
| | (a) | (b) | (c) | (mPa · s) | (N/cm) | (mAh/g) | (%) |
| Example 1 | 34 | 10 | 56 | 13,000 | 6.21 | 174.5 | 88.2 |
| Example 2 | 32 | 17 | 51 | 17,000 | 6.67 | 174.9 | 87.1 |
| Example 3 | 45 | 6 | 49 | 15,000 | 6.21 | 173.1 | 88.9 |
| Example 4 | 25 | 19 | 56 | 11,000 | 6.67 | 174.1 | 89.1 |
| Example 5 | 31 | 23 | 46 | 12,000 | 6.56 | 173.7 | 86.1 |
| Example 6 | 30 | 7 | 63 | 12,000 | 6.98 | 172.9 | 87.3 |
| Example 7 | 41 | 12 | 47 | 8,000 | 6.12 | 172.4 | 86.0 |
| Example 8 | 29 | 11 | 60 | 24,000 | 6.31 | 173.3 | 87.4 |
| Example 9 | 26 | 24 | 50 | 18,000 | 6.56 | 173.0 | 88.1 |
| Example 10 | 38 | 8 | 54 | 10,000 | 6.42 | 171.9 | 88.5 |
| Comparative Example 1 | 21 | 7 | 72 | 14,000 | — | —[1] | —[1] |
| Comparative Example 2 | 42 | 24 | 34 | 11,000 | — | 166.2 | 71.3 |
| Comparative Example 3 | 21 | 33 | 46 | 12,000 | — | 166.3 | 71.1 |
| Comparative Example 4 | 43 | 0 | 57 | 13,000 | — | 165.3 | 72.4 |
| Comparative Example 5 | 53 | 13 | 34 | 11,000 | — | —[1] | —[1] |
| Comparative Example 6 | 10 | 25 | 65 | 10,000 | — | —[1] | —[1] |

[1] A viable battery could not be produced.

What is claimed is:

1. A binder composition for a secondary battery electrode comprising a copolymer and a dispersion medium, wherein the copolymer comprises a structural unit (a) derived from a monomer containing an acid group selected from the group consisting of carboxylic acid, sulfonic acid, sulfuric acid, phosphonic acid, phosphoric acid, nitric acid, their salts, their derivatives, and combinations thereof; a structural unit (b) derived from a monomer selected from the group consisting of an amide group-containing monomer, a hydroxyl group-containing monomer, and combinations thereof; a structural unit (c) derived from a monomer selected from the group consisting of a nitrile group-containing monomer, an ether group-containing monomer, an epoxy group-containing monomer, a carbonyl group-containing monomer, a fluorine-containing monomer, and combinations thereof; wherein the proportion of structural unit (b) in the copolymer is from about 4% to about 25% by mole, based on the total number of moles of monomeric units in the copolymer in the binder composition; and wherein the binder composition is free of a structural unit derived from an ester group-containing monomer and a structural unit derived from a conjugated diene group-containing monomer.

2. The binder composition according to claim 1, wherein the carboxylic acid is selected from the group consisting of acrylic acid, methacrylic acid, crotonic acid, 2-butyl crotonic acid, cinnamic acid, maleic acid, maleic anhydride, fumaric acid, itaconic acid, itaconic anhydride, tetraconic acid, 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2- hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxy-acrylic acid, β-trans-aryloxyacrylic acid, α-chloro-β-E-methoxyacrylic acid, methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate, maleic anhydride, methyl maleic anhydride, dimethyl maleic anhydride, acrylic anhydride, methacrylic anhydride, methacrolein, methacryloyl chloride, methacryloyl fluoride methacryloyl bromide and combinations thereof.

3. The binder composition according to claim 1, wherein the proportion of structural unit (a) in the copolymer is from about 15% to about 50% by mole, based on the total number of moles of monomeric units in the copolymer in the binder composition.

4. The binder composition according to claim 1, wherein the amide group-containing monomer is selected from the group consisting of acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl) methacrylamide, N-(ethoxymethyl) methacrylamide, N-(propoxymethyl) methacrylamide, N-(butoxymethyl) methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide, N-hydroxymethyl acrylamide and combinations thereof.

5. The binder composition according to claim 1, wherein the nitrile group-containing monomer is selected from the group consisting of acrylonitrile, α-halogenoacrylonitrile, α-alkylacrylonitrile, α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl) acrylonitrile, α-(chlorophenyl) acrylonitrile, α-(cyanophenyl) acrylonitrile, vinylidene cyanide and combinations thereof.

6. The binder composition according to claim 1, wherein the proportion of structural unit (c) in the copolymer is from about 46% to about 65% by mole, based on the total number of moles of monomeric units in the copolymer in the binder composition.

7. The binder composition according to claim 1, wherein the dispersion medium is water.

8. The binder composition according to claim 7, wherein the dispersion medium further comprises a hydrophilic solvent selected from the group consisting of ethanol, isopropanol, n-propanol, tert-butanol, n-butanol, dimethylacetamide, dimethylformamide, N-methylpyrrolidone, methyl ethyl ketone, ethyl acetate, butyl acetate and combinations thereof.

9. The binder composition according to claim 1, wherein the molar ratio of the sum of structural unit (a) and structural unit (b) to structural unit (c) within the copolymer of the binder composition is from about 0.5 to about 1.2.

10. The binder composition according to claim 1, wherein the pH of the binder composition is from about 7 to about 10.

11. The binder composition according to claim 1, wherein the viscosity of the binder composition is from about 5,000 mPa·s to about 25,000 mPa·s.

12. The binder composition according to claim 1, wherein the electrolyte swelling of the binder composition is from about 1% to about 15%.

13. The binder composition according to claim 1, wherein the solid content of the binder composition is from about 1% to about 20% by weight, based on the total weight of the binder composition.

14. The binder composition according to claim 1, wherein the number-average molecular weight of the copolymer in the binder composition is from about 30,000 g/mol to about 100,000 g/mol.

15. The binder composition according to claim 1, wherein the weight-average molecular weight of the copolymer in the binder composition is from about 100,000 g/mol to about 200,000 g/mol.

16. An electrode for a secondary battery, comprising a current collector and an electrode layer coated onto said current collector, wherein said electrode layer comprises an electrode active material, and the binder composition according to claim 1.

17. The binder composition according to claim 1, wherein the adhesive strength between the binder composition and the current collector is from about 1 N/cm to about 10 N/cm.

18. The electrode according to claim 16, wherein the peeling strength between the current collector and the electrode layer is in the range from about 1.0 N/cm to about 8.0 N/cm.

19. The electrode according to claim 16, wherein the electrode layer further comprises a conductive agent.

* * * * *